United States Patent [19]

Roch et al.

[11] 4,074,350
[45] Feb. 14, 1978

[54] SOFT-WIRED MACHINE TOOL CONTROL

[75] Inventors: Gerald V. Roch, Indianapolis, Ind.;
James P. Wiles, Olean, N.Y.

[73] Assignee: Hurco Manufacturing Company Inc., Indianapolis, Ind.

[21] Appl. No.: 663,538

[22] Filed: Mar. 3, 1976

Related U.S. Application Data

[63] Continuation-in-part of Ser. No. 558,213, March 14, 1976.

[51] Int. Cl.² .............................................. B21D 5/02
[52] U.S. Cl. .......................................... 364/107; 72/8;
364/474; 364/300
[58] Field of Search ............... 340/172.5; 83/71; 72/8; 444/1; 235/151.1, 151.11, 151

[56] References Cited

U.S. PATENT DOCUMENTS

| Re. 25,670 | 10/1964 | Hansen et al. | 480/6 |
|---|---|---|---|
| 3,618,349 | 11/1971 | Roch | 72/8 |
| 3,746,845 | 7/1973 | Henegar et al. | 235/151.11 |
| 3,821,525 | 6/1974 | Eaton et al. | 235/151.1 |
| 3,874,205 | 4/1975 | Roch et al. | 72/8 |
| 3,937,934 | 2/1976 | Pasemann | 235/151.21 |

OTHER PUBLICATIONS

"Micro 800 Block Diagram" in Microprogramming Handbook, by Microdata, p. 73, June 1971.
"Monolithic Processors" in Computer Design, pp. 87–85, Oct. 1974.

*Primary Examiner*—Eugene G. Botz
*Attorney, Agent, or Firm*—Woodard, Weikart, Emhardt & Naughton

[57] ABSTRACT

A microprocessor unit (MPU), together with appropriate memory devices of the read only (ROM) and random access (RAM) type, and peripheral interface adapters (PIA), light emitting diode (LED) displays, and back lighted information displays, is included in a pendant control cabinet having on the front thereof a control panel with arrays of push-buttons for entering data and instructions, and windows displaying data and operational information. The pendant control is mountable as original equipment or as a retrofit installation to a machine tool, such as a press brake or milling machine, to control tool or gauge slide drives for positioning as needed during the desired sequences of operation.

10 Claims, 13 Drawing Figures

SOFT-WIRED MACHINE TOOL CONTROL

CROSS REFERENCE TO RELATED APPLICATIONS

This application is a continuation-in-part of application Ser. No. 558,213 filed Mar. 14, 1976.

BACKGROUND OF THE INVENTION

1. Field of the Invention

This invention relates generally to machine tools and more particularly to controls for positioning a workpiece or working component of the machine tool.

2. Description of the Prior Art

Much has been done in the field of numerical control of machine tools. Some U.S. Pat. Nos. which have issued on this subject in the United States are as follows:

3,555,516 - Proctor
3,573,737 - Rosenberg
3,576,540 - Fair et al
3,576,979 - McCall et al
3,626,385 - Bouman
3,634,661 - Fitzner
3,634,662 - Slawson
3,653,072 - Ballas et al
3,668,653 - Fair et al
3,720,814 - Klein
3,720,817 - Dinwiddie
3,725,651 - Cutler
3,725,652 - Knovalina
3,727,191 - McGee
3,739,158 - Woodward
3,746,845 - Henegar et al
3,763,360 - Nishimura et al
3,770,947 - Deily
3,784,798 - Beadle et al
3,812,474 - Linn et al
3,827,030 - Seipp
3,843,875 - Goodstal et al
3,849,712 - Lankford et al
3,670,153 - Rempert et al In addition, there is now offered a hardwired solid-state controller for new milling machines by Cincinnati Milacron Company of Cincinnati, Ohio, where the control panel is pendant-mounted, as is a Cybelec (Swiss) back gauge control panel.

While several of the above patents and machines on the market employ controls with programs on cards or magnetic or paper tapes, the equipment required is often large and too expensive for economical adoption by the prospective customer. Furthermore, much of it, while available on new machine tools, is not adaptable to existing machine tools. Yet there are many machine tools throughout the world which could be greatly improved in utility if provided with economical numerical controls.

Several steps in this direction have been taken already and are represented by the U.S. Pat. of Gerald V. Roch, No. 3,618,349 for GAUGING SYSTEM FOR PRESSES issued Nov. 9, 1971. That patent describes manually pre-programmable front and rear gauging for press brakes and which could be readily retrofitted to existing press brakes. A more recent advancement is diclosed in the U.S. Pat. of Gerald V. Roch and Edward H. Sonn, No. 3,874,205 entitled DIGITALLY CONTROLLED MULTIPLE DEPTH STOP AND RETURN STROKE LIMIT CONTROL FOR PRESS BRAKES and issued Apr. 1, 1975. This can be retrofitted also to press brakes for pre-selecting various ram stroke depth and return stroke travel dimensions. There has remained a need for more options in such equipment at lower cost, and a more compact control panel readily movable in accordance with the wishes of the operator. The present invention is intended to answer at least some of these additional needs.

SUMMARY OF THE INVENTION

Described briefly in the illustrated embodiment of the invention, a pendant control box and panel conveniently mounted to the machine tool has arrays of buttons thereon for entry of data and instructions for control of such functions as front and rear gauge positions and ram limits for a press brake, for example. The control box has a controller therein, including at least one programmed memory chip, a random excess memory chip to store data manually entered, according to the instructions, also manually entered. A microprocessor executes according to a program stored in the programmed memory, and according to instructions and, operating through various peripheral interface adapters, provides the displays of information and the control signals to motor drives for positioning front and rear gauges, ram or other machine tool components, according to the particular application.

Appendix A is a brief narration of a program useful with the controller in a typical embodiment of the invention having the multiple depth stop type of ram control.

Appendix B is the program itself using the Motorola M6800 microprocessor instruction code.

DESCRIPTION OF A PREFERRED EMBODIMENT

Figure 1:
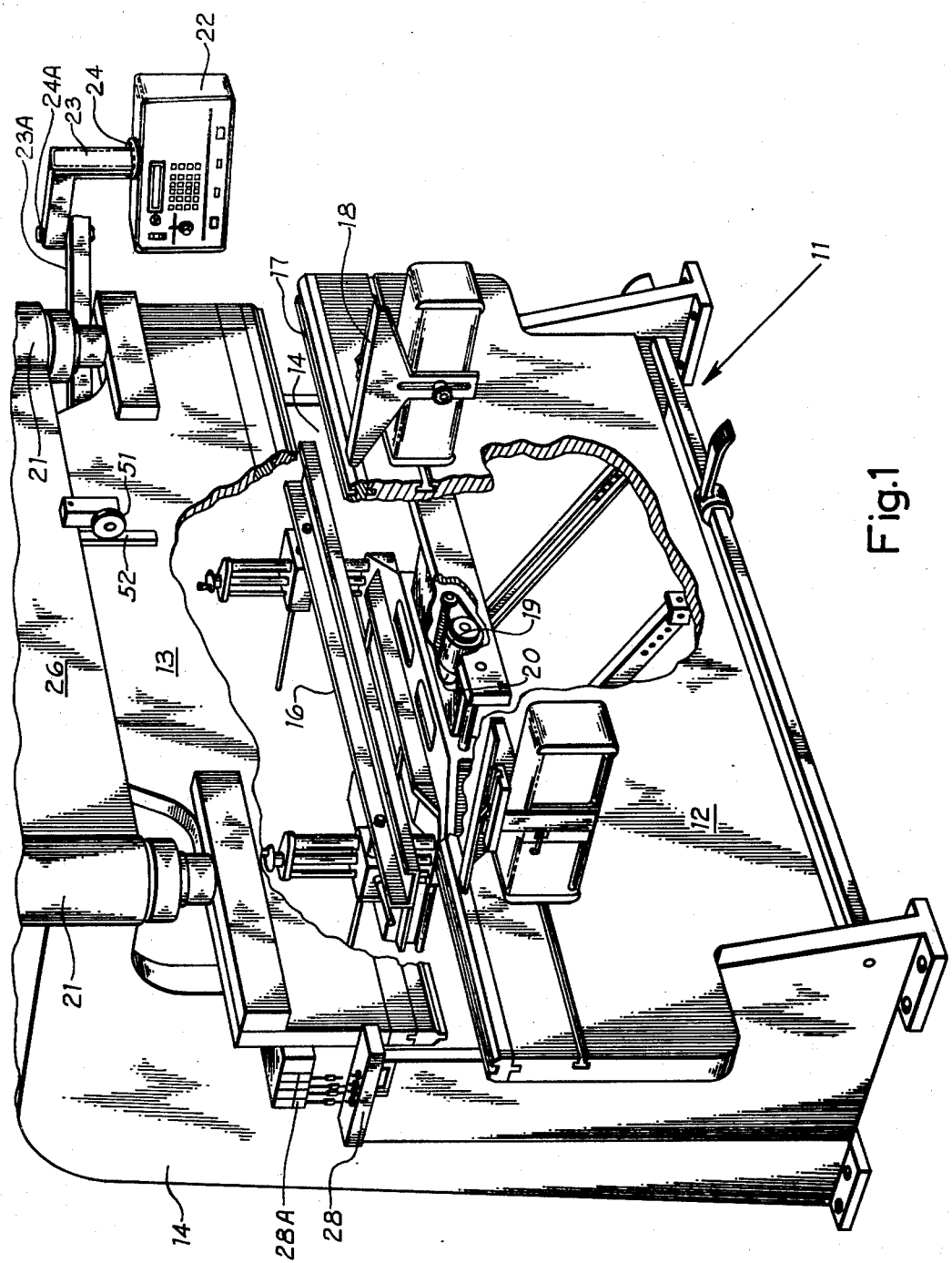
FIG. 1 is a general perspective view of a press brake incorporating a typical embodiment of the present invention thereon.

Referring to FIG. 1 which shows a preferred embodiment of the present invention as applied to a press brake, the press brake 11 has a bed 12, ram 13, and side frames 14. The ram can be hydraulically or mechanically driven. There is a back gauge 16 mounted to the bed behind the lower die 17, and a front gauge 18 mounted to the bed in front of the lower die 17..Both gauges can be driven by linear lead screws driven by electrical motors as at 19 driving screw 19S which motors are servocontrolled and have shaft angle encoders as at 20 to count the turns of the shaft as driven by the lead screw. The ram 13 may be driven by a pair of hydraulic cylinders 21.

A pendant control cabinet 22 is swivel mounted to an arm 23 at 24 which swivels at 24A to arm 23A swivel mounted to the fixed upper cross member 26 or side frame of the press brake. A power supply and amplifier box or cabinet 27 may be provided at any suitable location. A series of depth limit switches can be provided as at 28 similar, for example, to the arrangement shown in U.S. Pat. No. 3,824,822.

Figure 2:
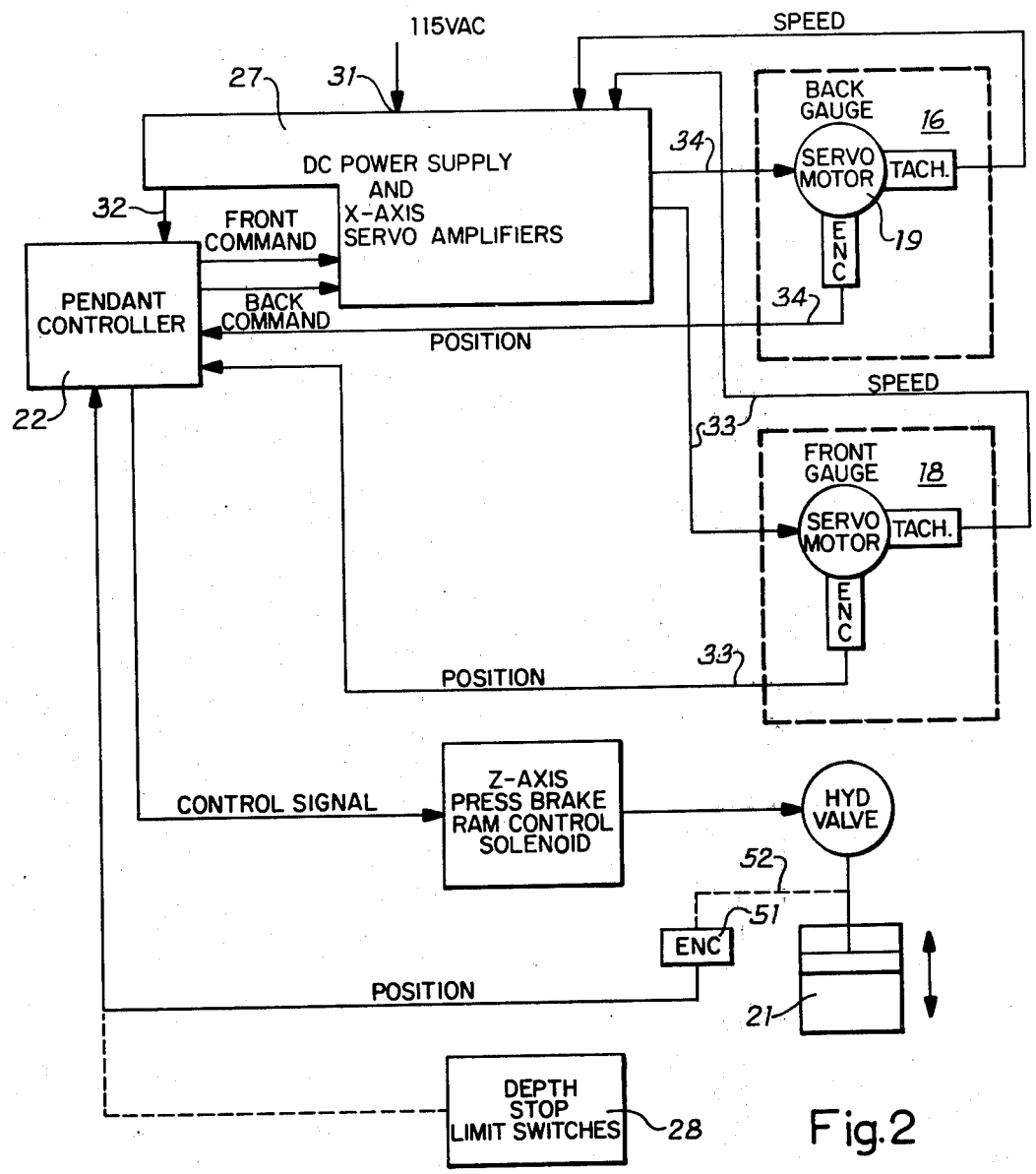
FIG. 2 is a major component block diagram.

Referring to FIG. 2, where power and signal transmission couplings are represented by lines between blocks, 115 volt AC electrical energy is supplied to the apparatus through the power supply and amplifier box 27 at 31, and 24 volt DC is supplied from there to the pendant control 22 through cable 32. Cable 32 may extend through the interior of the arm 23 along with conductors for ram digital control, ram depth stop control, and front and rear gauge control. Cables 33 and 34 between the power supply box and the front and rear gauges respectively, carry conductors for gauge motor drive, encoders, tachometers, and limit switches. Cables 35, 36 and 37 from the ram depth stop switches 28, digital encoder 51, and ram limit switch 31 are conveniently handled through the power supply box for coupling to the control cabinet 22.

Figure 3:
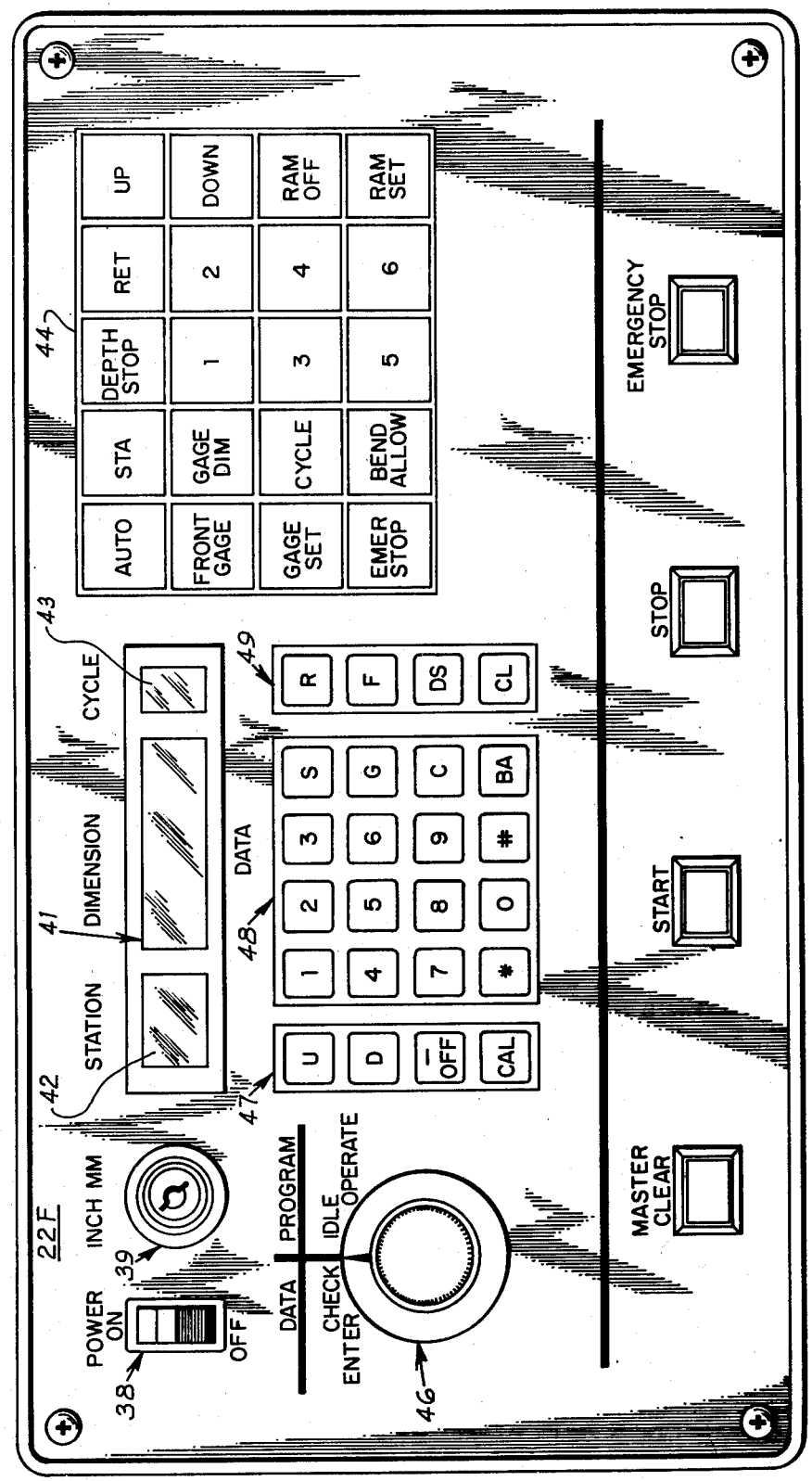
FIG. 3 is an enlarged view of the control panel.
Figure 4:
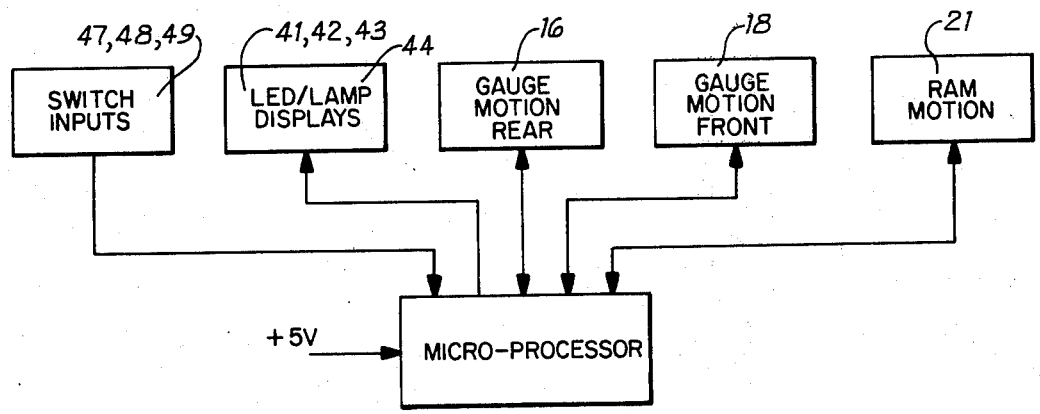
FIG. 4 is a block diagram of the control cabinet contents.

Referring now to FIG. 3, there is shown the front panel 22F of the control cabinet or pendant 22. A switch 38 is provided to connect and disconnect electrical power from the entire apparatus. A keylock switch 39 is provided to enable the choice between English or metric dimensions for entry of data in either inches or millimeters. It also provides for display of the entered data in the dimension data window 41 in either inches or millimeters. A set of light-emitting diodes (LEDs) is provided behind this window as is true also of the station indicating window 42 and the cycle indicating window 43. These three windows provide the LED displays.

Another type of display is provided on the backlighted display panel 44 in which there are legends as shown in FIG. 3, with each of the legends having an independently illuminated incandescent bulb in one "cell" of an egg-crate shield assembly, behind the panel to illuminate one or more of the legends depending on which lamps are lighted in accordance with the state of operation of the control.

A four position rotatable mode switch 46 is provided, the four positions of which enable selection of one of four modes, two of them being in the "DATA" category for the data entry mode ("ENTER") and for the data check mode ("CHECK") and two of them in the "PROGRAM" condition category, one of which is "IDLE" and the other of which is "OPERATE."

Immediately to the right of the mode switch 46 there is a ram function column of switches 47 having four switch-operating keys or buttons therein with labels thereon as shown. Immediately to the right of that is a bank 48 of data entry switch buttons, ten of which have numerals therein for entry of numbers, and four of which have letter legends thereon to designate a category of data for the numbers to be entered by the button-operated switches in the keyboard switch bank 48. Immediately to the right of this bank of 16 buttons there is a miscellaneous function bank 49 of push button operated switches, the four buttons of which have legends on the faces thereof.

Across the bottom of the panel there are four buttons identified "MASTER CLEAR," "START," "STOP," and "EMERGENCY STOP." The "MASTER CLEAR" button being guarded, is not susceptible to being pushed by brushing against it or otherwise than by a deliberate manual act, and thus not accidentally.

In contrast with the apparatus described in the above-mentioned Roch patent, where digital thumbwheel switches were set for each digit of a dimension to be used, and for each different position at which a gauge or movable workpiece stop is to be located during the making of a bend in the workpiece, the present invention provides the keyboard 48 by which the dimensions can be entered into a memory and the number of the station at which each of the dimensions is entered can be entered along with the dimension. The illustrated keyboard includes momentary-contact proximity switch operating push buttons with nine positive integers and zero thereon as shown in FIG. 3. Some users may prefer that discernible button movement be provided for switching during pushing. Others may prefer that a push as light as the mere touch of the button, with no discernible movement thereof, accomplish the switching. So it is that various types of momentary contact type switching can be employed to enter data in the memory. Therefore, the number of digits in a dimension is not limited by the number of buttons, or by the number of digital thumbwheel switches as was true in the above-mentioned Roch U.S. Pat. No. 3,618,349, nor is the number of stations limited by the number of sets of digital thumbwheel switches, which was six sets in that patent. Therefore, the present invention can be employed to enter dimenions for any number of stations, depending upon the capacity of the memory components selected, and sixteen stations would be one example of a suitable number. This would make possible selection of sixteen different points at which a gauge could be located to serve for making a particular bend in a workpiece in a press brake. Also, the number of stations can be distributed as desired between front and back gauges, where the unit is equipped with both front and back gauges. For example, ten bends could be made with ten different back gauge positions, and six bends employing the front gauge or gauges at six different positions.

To better appreciate the purpose of the various switches, buttons, and legends, the various functions thereof will now be described with reference to the application of the illustrated embodiment to front and back gauge assemblies as applied to a press brake such as, for example, in the aforementioned U.S. Pat. No. 3,618,349 and as applied to depth stop and return stroke limit control as described in the above-mentioned U.S. Pat. No. 3,874,205, and in a leaflet entitled "First Two-Axis NC for Hydraulic Press Brakes" distributed by Hurco Manufacturing Company, Inc., in October of 1973.

The apparatus is energized by pushing the master power switch 38 to the "ON" position. Switch 39 is placed in the appropriate position, depending upon whether data is to be entered in inches or millimeters. The mode switch is placed in the "ENTER" position, and the station select button "S" in group 48 is pushed. Then the number "1" is entered by pushing the "1" button in group 48 to designate that the data to be entered is for station 1 in the control sequence. At that point the station window has the number "1" displayed therein, and the "STA" window in the function display panel 44 is illuminated.

Then the cycles button "C" in group 48 is pushed, and one of the numbered buttons in that group is then pushed depending upon the number of times in the press brake sequence the same gauge dimension is to be used. In other words, the number of times that the ram is to descend to make a bend in the workpiece, without changing the gauge position, is entered in the data entry keyboard 48 after the cycle switch button "C" is pushed for station 1. That number is then displayed in the cycle window 43, and the cycle window in the function display 44 is illuminated, the station legend being still illuminated in the function display 44 and the station number appearing in station display window 42. The number of cycles which can be employed will depend upon the capacity of the memory and other hardware.

Next, the "G" button on the data keyboard 44 is pushed, whereupon the "GAGE-DIM" legend in the function display panel 44 is illuminated, and then five keys in the data entry keyboard 48 are pushed to enter the five digits representing the gauge location, such as 13.755 for example. These digits are then displayed in the dimension display window 41.

If a bend allowance is to be applied to the gauge dimension, the "BA" button is pushed, lighting the "BEND ALLOW" legend in the panel 44 and extinguishing the "GAGE-DIM" legend. Then the keys in the data board 48 are pushed to enter the bend allowance number, and that number is displayed in the dimension window 41. The bend allowance programmed for any station will be automatically subtracted from each gauge dimension programmed.

If a mistake has been made in the entry of data, the particular function in which the mistake has been made is selected by pushing the function button such as "G" in group 48 for gauge data entry, or "C" for cycle data entry, or "BA" for bend allowance data entry, and then pushing the "CL" button in the miscellaneous function column 49. Then, for the particular data to be corrected, the appropriate button such as "G", "C", or "BA" is pushed again, and the numbered buttons appropriate to the correct data are again pushed for entry of the correct data. If it happens that the operator wishes to clear all data which has been entered from the beginning of entry of data, the program clear button, identified "MASTER CLEAR" in the lower group, is pushed, and it clears all information from the random access memory.

After all of the data appropriate to station 1 has been entered, then the station button "S" is again pushed, and the number 2 button in group 48 is pushed, and the same sequence of entering data, cycles, gauge, and bend allowance, if any, is entered as discussed above with respect to station 1. The same procedure is performed for all of the stations to be programmed in the controller.

If it happens that the controller is equipped with the ram control option, some additional entries are made for each station. This will now be described.

As mentioned briefly above, the control of the present invention is applicable to control of the ram of a press brake, regardless of whether the control be accomplished by the use of a rotary encoder for sensing the up and down travel of the ram, or the use of a number of different depth stops and limit switches associated therewith and various enabling and disabling circuits for sequentially enabling and disabling the limit switches according to the particular depth stop to be employed for control of the ram at any given stroke.

Considering first the application of the control to the press brake where equipped with a rotary encoder on the upper cross member 26 and an encoder drive rod 52 secured to the ram, following the selection of the station, the number of cycles for that station, and entry of the gauge dimension and any bend allowance for that station, some further entries are made. These are made in association with the use of buttons in the ram function control button column 47. In this column there is a "U" button for use in entry of the dimension for the upstroke of the ram, a "D" button for entry of the dimension of the downstroke of the ram, an "Off" button for entry of an offset dimension, and a "Cal" button for establishing a dimensional reference point for the ram in accordance with the tooling employed in the press brake. Therefore, in the same manner as dimensional data was entered on the keyboard 48, subsequent to pushing the "G" button, the upstroke dimensional data for the ram can be entered for a given station following the pushing of the button "U". The downstroke dimensional data can be entered on panel 48 after pushing the "D" button. The offset dimension can be entered on keyboard 48 following the pushing of the "OFF" button. The offset dimension is one which is determined by experience with the particular press brake involved on the various kinds and thicknesses of workpiece materials used, in order to provide an electrical signal to the press brake control circuitry soon enough to compensate for coasting effects of the ram, and stop the ram at the right location, thereby providing the proper closure for the ram at all stations regardless of whether programmed for full depth bending operations, or for "air bending" operations where the dies are not closed completely to make a band of less than the included angle in the "V" die.

If the press brake is equipped with a depth stop type of ram control such as in a Pacific brand hydraulic press brake with automatic multiple depth stop, Model 135-N, Ser. No. 3617, for example, or as in the above-mentioned U.S. Pat. No. 3,824,822, the buttons in group 47 are not used, but instead the "DS" button in the miscellaneous function group 49 is employed. Then, depending upon the particular depth stop which is to be used for the station involved, one of the buttons on keyboard 48 is depressed to select that particular depth stop. The depth stop lamp and the numeral corresponding to the button depressed, will be illuminated in the display panel 44. In this way, the control is set up to select a particular relay for that station, the relay being activated in response to operation of one of the limit switches 28 by a manually pre-adjusted micrometer 28A, for example, to stop descent of the ram at the correct location.

Two additional buttons in group 49 are the "R" button and the "F" button. The "R" button is a button used during the programming so that if, for the bend to be made at one station, the bend made for the preceding station was such as to require removal of the part for some other handling that necessitates full retraction of the gauge involved for the new dimension to be used, by pushing the "R" button, the gauge will retract fully before advancing to the dimension being put in the station at which the "R" button is pushed. In the display panel 44, the "RET" window is illuminated while the gauge retract function is taking place.

The "F" button in group 49 designates that the data being entered for a station is for the front gauge and this button may be pushed instead of the "G" button. Otherwise, all data are assumed to be entered for control of a rear gauge. There is a "FRONT GAGE" window in panel 44 which is lighted when the machine is in the operating mode to indicate that for that particular station the front gauge is the one to be used.

If the mode switch 46 is placed in the "CHECK" position, one can review all of the data entered. By selecting the station, which involves pushing the "S" button and one of the numbered buttons in the data keyboard 48, the control will display the station number in window 42, the number of cycles in window 43, the gauge dimension data in window 41, and the "FRONT GAGE" window in the panel 44 will be illuminated if it is a front gauge which was selected for that station. If a depth stop arrangement is employed, the number of the depth stop selected will appear in window 44 according to which depth stop is involved for that particular station.

The display will be maintained until the station button is pressed again. Then, to go to the next sequential station, the "S" button is again pressed, whereupon the display for that station begins and for each function the appropriate data is presented and appropriate windows are illuminated.

When the mode switch is in the "IDLE" position, the controller maintains servo drive and memory to the last position made during the "OPERATE" mode. Data cannot be entered, nor can any operations be performed. Although the power is on and the memories retain all information therein, nothing can happen. Thus the operator can leave the controller for a break or a change of shifts without worrying about someone approaching the controller, pushing buttons, and destroying data or causing the machine to function.

When the mode switch 46 is in the "OPERATE" position, data which has been entered is now capable of being executed or performed. This is accomplished by pushing the station button "S" and then the station number button in the data board. That station number is then displayed in window 42; the program therefor is displayed in window 41; the number of cycles at which that dimension is to be used in displayed in window 43; and if the operator is satisfied that everything is correct, he depresses the "START" button in the bottom row of buttons. As soon as he does that, the "AUTO" window in panel 44 is illuminated, and the designated gauge moves to the programmed dimension. As soon as it reaches the programmed dimension, within a predetermined tolerance band, the "GAGE SET" window in panel 44 is illuminated. Then, by operating the foot pedal or other means for causing the ram to descend, the operator can make the first bend. If the ram control option is used with an hydraulic press brake, the ram will descend to the dimension selected therefor and return when the operator lifts his foot from the control pedal, or automatically if the press brake is set up for automatic return. When the ram descends to the selected dimension, within a predetermined tolerance band, the "RAM SET" window in panel 44 will be illuminated. When the ram rises, it will rise to the "UP" dimension previously entered for that station. Then the controller will advance. It will advance to the second cycle for the first station if more than one operation is to be performed with the gauge dimension selected for the first station. On the other hand, if only the one cycle was selected for the first station, the control will then advance to the next station and move the gauge designated for that station to the appropriate position for that station according to the pre-programmed data in the memory. If the gauge used during the preceding station is not to be used in the subsequent station, that gauge will retract fully and automatically. On the other hand, if the gauge will be the same gauge, but full retract is nevertheless necessary, the prior instruction by having pushed the retract button "R" during the entry of data for the second station, will cause the gauge to retract fully. It will stay fully retracted for a predetermined delay of ten seconds, for example, and then again position to the next programmed dimension.

The operations will continue until all of the stations which have been programmed, and all of the cycles for the last station in the program, have been completed, with an operation of the ram between each cycle and the next cycle. The ram operation is always manually initiated, in order to be certain that the operator has had time to place the workpiece correctly against the gauge involved and get his hands clear of the dies. Thus there is no sacrifice in safety. The "Stop" button in the lower row of four is a program stop button and, when pushed, stops execution of the program after completion of the execution of the data for the particular station and cycle being executed at the time of pressing the program stop button. To start up again, the operator must select the station involved and then push the "Start" button in the lower row of buttons. If the operator was going from station 2 to station 3 and failed to get the part out when the gauge was retracted, and the gauge is moving into the position for station 3, he pushes the program stop button and the gauge will stop when the positioning for station 3 is finished. Then, if he wants to go back to station 2, he pushes the station button "S" and then the number "2" button in the keyboard 28, and then the "Start" button. To select station 3, he pushes the "S" button and the "3" button, and then the "Start" button.

For the inch-metric mode selection, and considering the capability of entering dimensions in five digits, a decimal point will be displayed in window 41 at the correct location, depending upon whether the inch or metric mode is selected, the decimal point display being hard-wired to the switch so it is located where it should be. The operator can enter data in either dimension, and subsequently display it in the other dimension. For example, if he has a drawing which is dimensioned in millimeters and he wants to enter the program in millimeters, but wants to inspect it in inches because the inspection tool is in the English units, the inch dimension can be displayed in window 41 by switching the switch 39 to the inch position.

Figure 6:
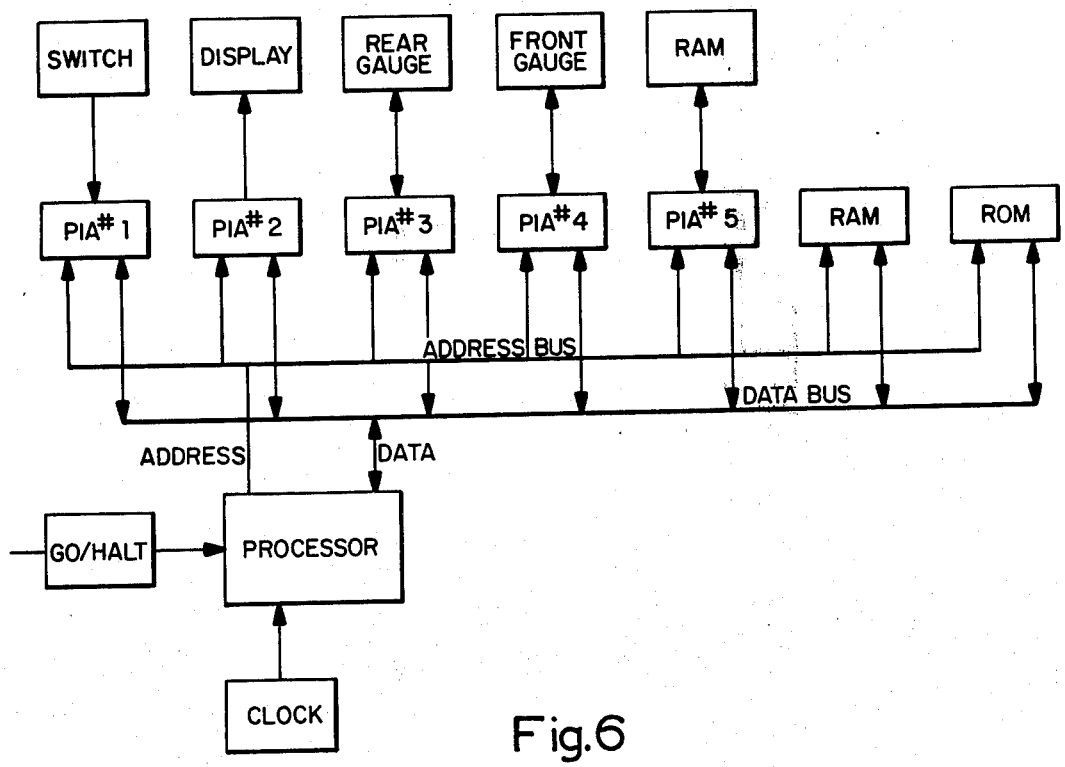
FIG. 6 is a functional block diagram of the microprocessor and peripherals.
Figure 5:
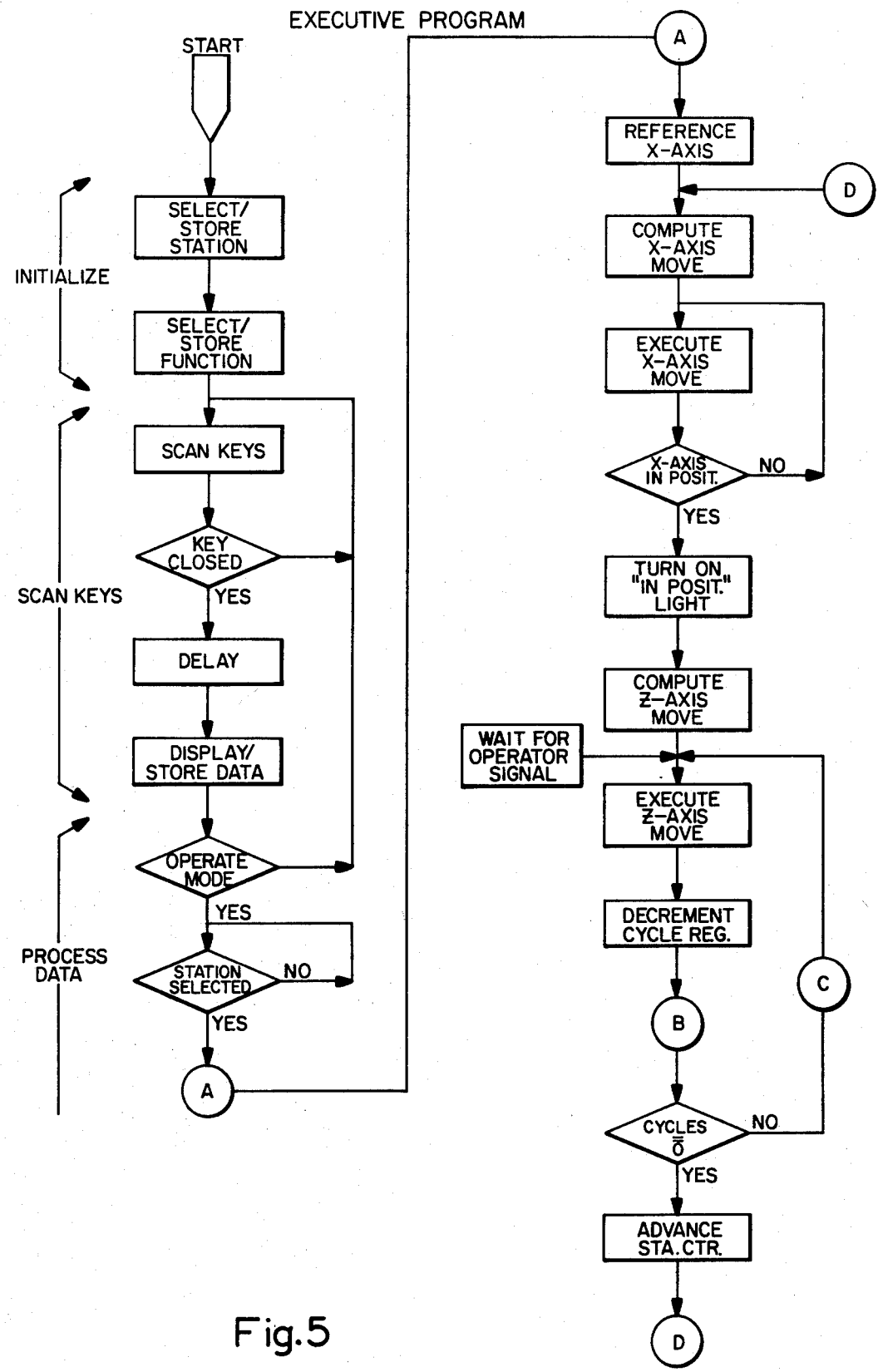
FIG. 5 is a flow chart.

The controller hardware is implemented with the M-6800 "family" of micro-computer components marketed by Motorola, Inc. and described in the Micro-Computer System Reference Handbook published in 1974 by Motorola, Inc. Peripheral interface adapters (PIAs) are used. PIA 2 (FIG. 6) is used for the keyboard switches. PIA 1 is for the incandescent and LED lamps in the displays. One of the LEDs is used for the cycle indication, five for the dimension indication, and two for the station indication. PIA 3 is used for the rear gauge control, PIA 4 for the front gauge control, and PIA 5 for the ram option or for the depth stop option. Normally one would not use both options in a given application of the controller to a machine tool.

Where the gauges are driven by screws, shaft angle encoders can be used to provide input representative of amount and direction of gauge motion. For the ram, the encoder 51, driven by the drive rod 52 mentioned above, can be employed.

Two additional buttons on the control panel which have not yet been discussed in any detail are the "MASTER CLEAR" button which, when pushed, will clear all of the data from the random access memories of the control. The "EMERGENCY STOP" button will stop all operations of gauges immediately upon pushing the button.

The asterisk button in keyboard 48 could be used as a delimiter. At the end of a program sequence for a particular station during the "ENTRY" mode, the delimiter button can be pressed, allowing the operator to use in the "OPERATE" mode a series of stations successively and repetitively as a group, without disturbing other workpiece gauging programs stored in the memory and involving other stations.

From the foregoing description, it should be recognized that the present invention provides an optimum in versatility of equipment, with a minimum of size, by incorporation of the entire control in the pendant control unit 22 of compact size and convenient location, employing the attributes of the Motorola M-6800 "family" of components. The pendant control unit itself is very small, being preferably 16½ inches wide, 9 inches high, and 7½ inches from front to rear.

Figure 7A:
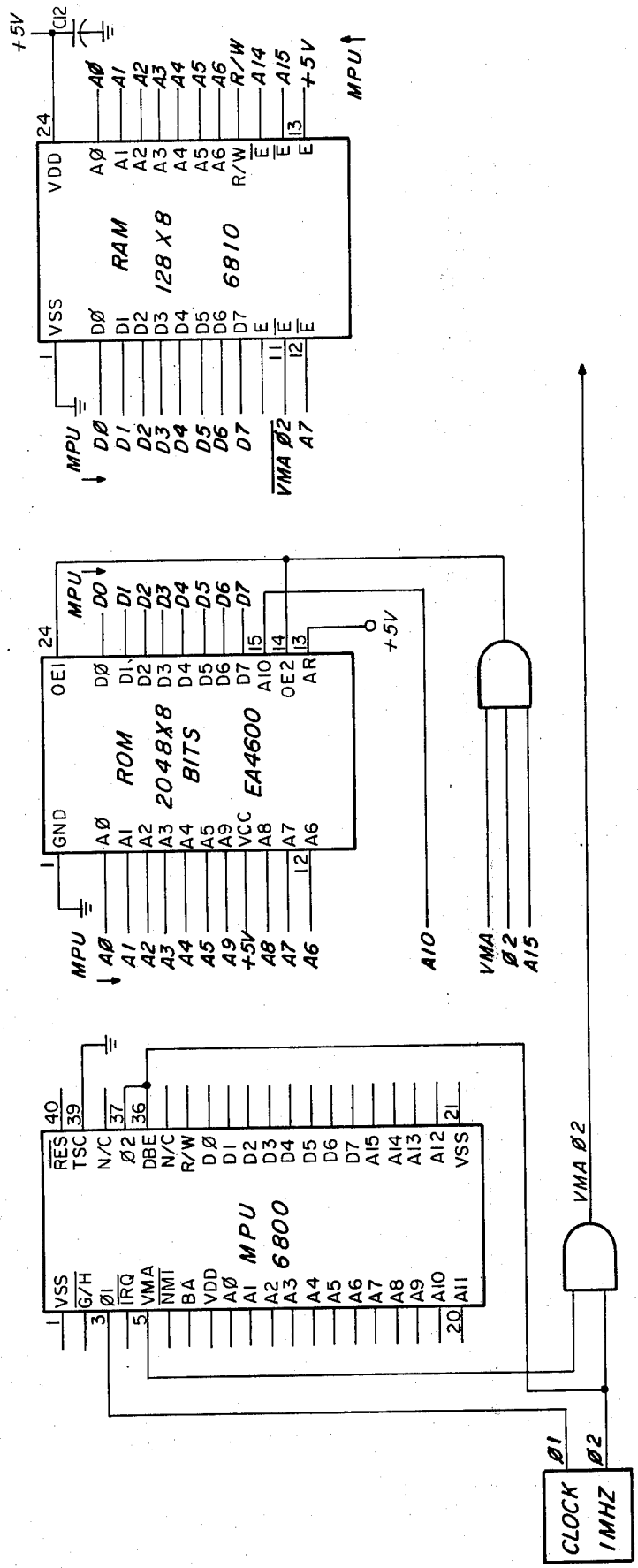
FIG. 7A is a logic diagram identifying the connections of the microprocessor unit (MPU) with the random access memory (RAM) and read only memory (ROM).

Referring now to FIGS. 7A through 7F, in FIG. 7A the MPU, RAM and ROM are shown, with the leads from the pins of the RAM and ROM labeled to show the pins of the MPU to which they are attached. The power on switch 38 (FIG. 3) is connected to the RES input of the MPU. The VMA $\phi 2$ output from the AND gate shown below the MPU is the memory timing signal and is coupled to the PIA's and inverted to the RAM. In the interest of speed, it is reproduced in the AND gate shown below the ROM and applied to enable input of the ROM. The inputs to the gate are from the MPU as indicated by the legend "MPU" and associated arrow. This legend is used above or below the columns of indicia at the leads outside the ROM and RAM, designating the terminals of the MPU to which the leads are attached. An input from an appropriate power failure detection circuit can be applied to the input E of the RAM to shut off the RAM and thereby protect against loss of stored data in the event of imminent power failure.

Figure 7B:
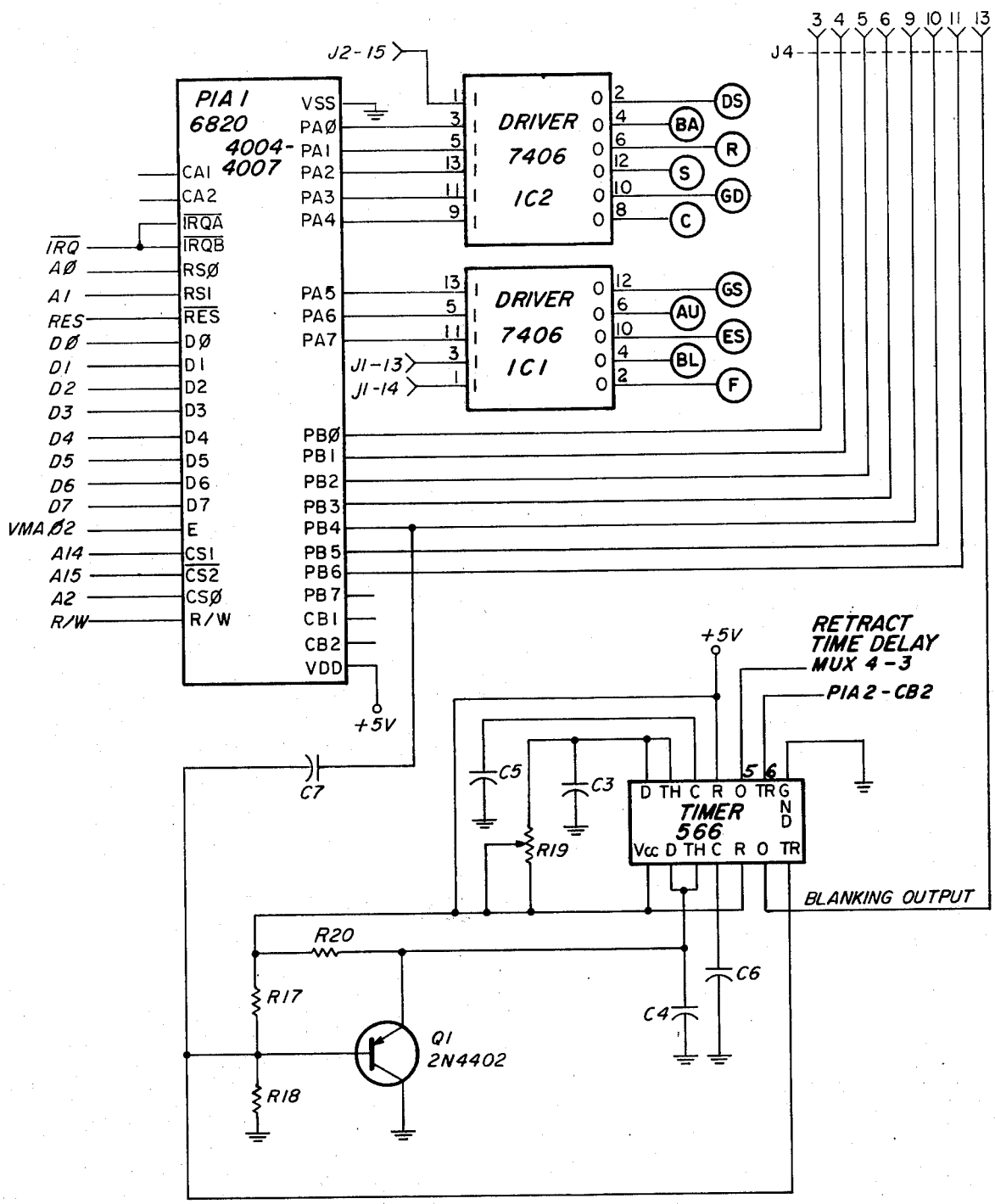
FIG. 7B is a schematic-logic diagram of coupling of PIA #1 with drivers for part of the incandescent display, with terminals for the LED display, and identifying the connections of PIA 1 to the MPU.
Figure 7C:
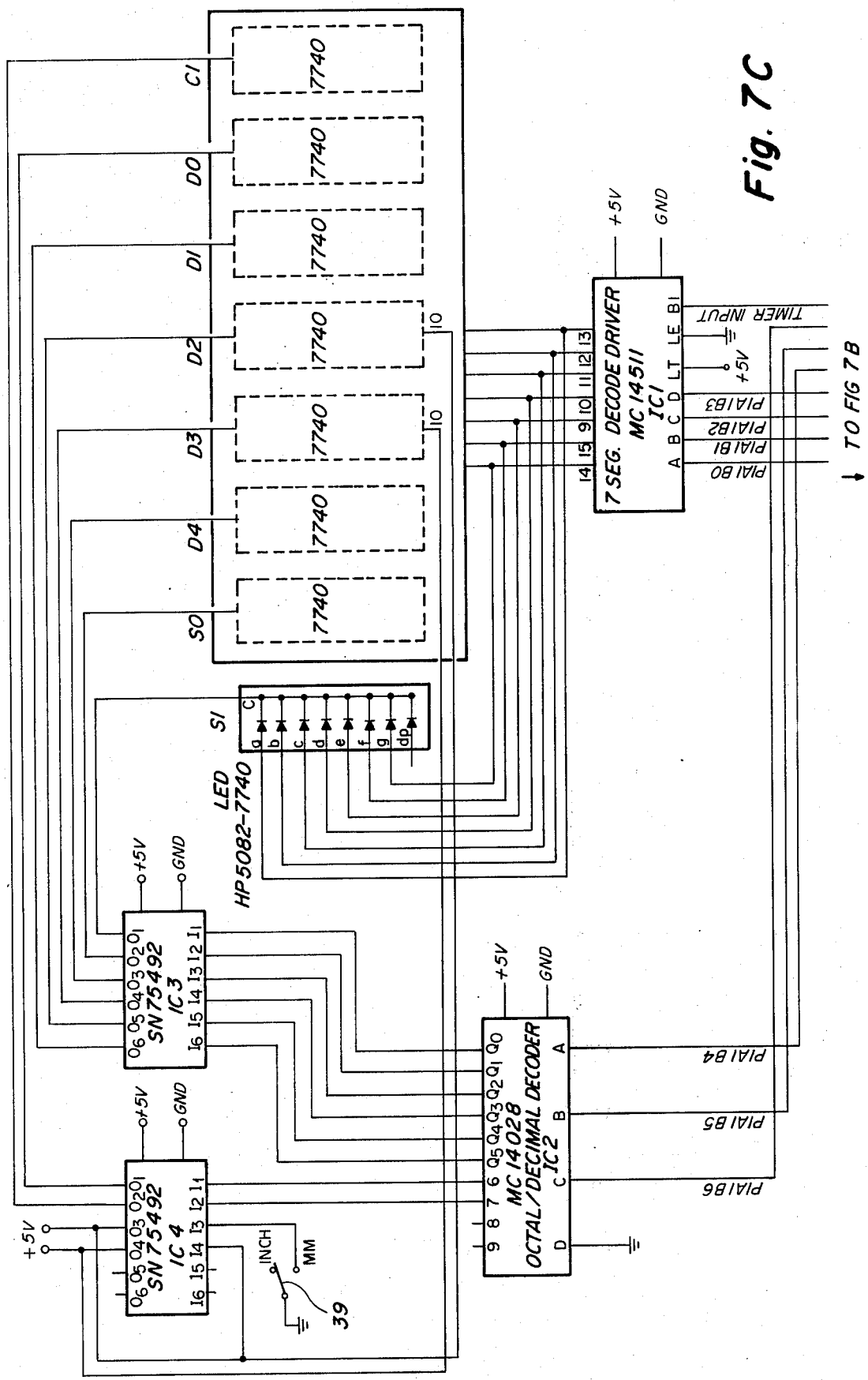
FIG. 7C is a logic diagram of the LED display and driver.

FIG. 7B shows the PIA #1 and its connection to the MPU (labels on leads to left of the PIA), its couplings to certain bulbs of the incandescent display (each bulb except BL and F having abbreviated indicia corresponding to the legends in the backlighted display panel 44 of FIG. 3), and its couplings to jacks for the LED display of FIG. 7C. The input through jack J2-15 to the driver IC1 is for the depth stop bulb DS and is obtained from the "Depth Stop" line in FIG. 7G. Bulb BL for a battery low indication, and F for front gauge selection and operation would replace two of the bulbs in the Depth Stop or ram up or down groups, depending on whether or not the press brake was equipped with the depth stops. The low battery indication is useful where batteries are to be used to preserve data in the RAM in the event of power failure. A low battery detection circuit can be used to provide the signal through jack J1-13 to the driver IC1 for bulb BL when the battery voltage is below an acceptable level. The signal for the F bulb through jack J1-14 would be provided from PIA #4 (FIG. 6) but which is not shown in detail here as it would be essentially the same as FIG. 7F.

The timer in FIG. 7B is used to provide signals for various timed events, including the retract time delay signals to PIA #2 and MUX 4 for providing the delay referred to above during which a gauge is fully retracted following a stroke of the ram, prior to moving to the next programmed dimension for the gauge. The blanking output is for blanking the LED display when it is not being scanned, and is applied through the "Timer Input" line to the decoder driver IC1 of FIG. 7C.

In FIG. 7C, one LED (S1) and the connections to it, are shown in detail. The other seven LED's are shown in dotted lines in a box. It should be understood that the MC 14511 Decode/Driver is connected to all eight LED's in the same way. This decode driver determines which segments of each LED are lighted. The octal/decimal decoder determines which LED's are lighted. The two LED's S1 and $S_o$ are for station number designation. C1 is for cycle number designation. The rest are for dimension designations. The inverter IC4 is used to respond to the inch/mm switch 39 of FIG. 3 to shift the decimal point between LED's D3 and D2. The LED's are scanned for energization one at a time.

Figure 7D:
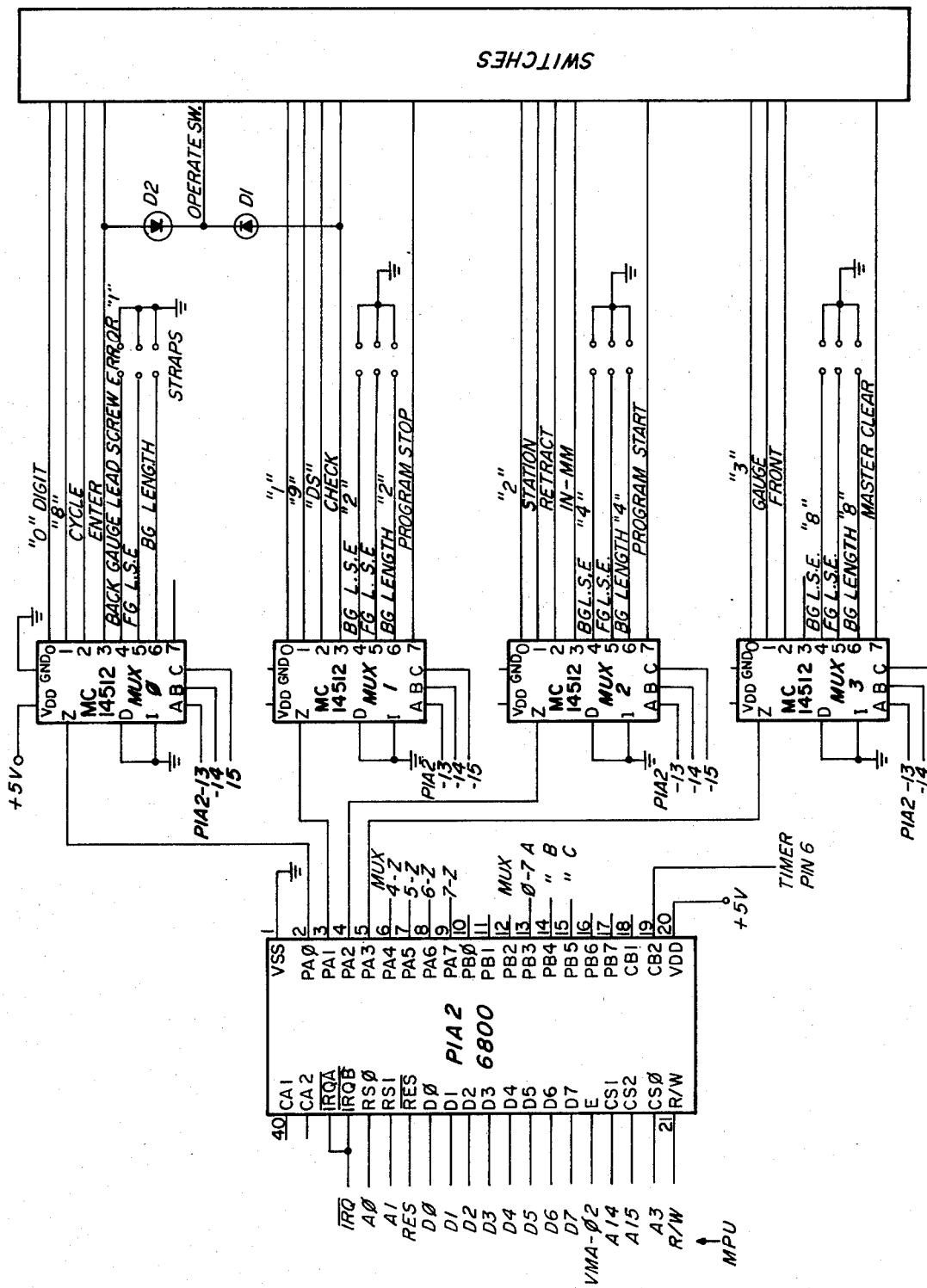
FIGS. 7D and 7E are two portions of a logic diagram of the switch scanning multiplexers, identifying the connections of PIA #2 to the MPU.
Figure 7E:
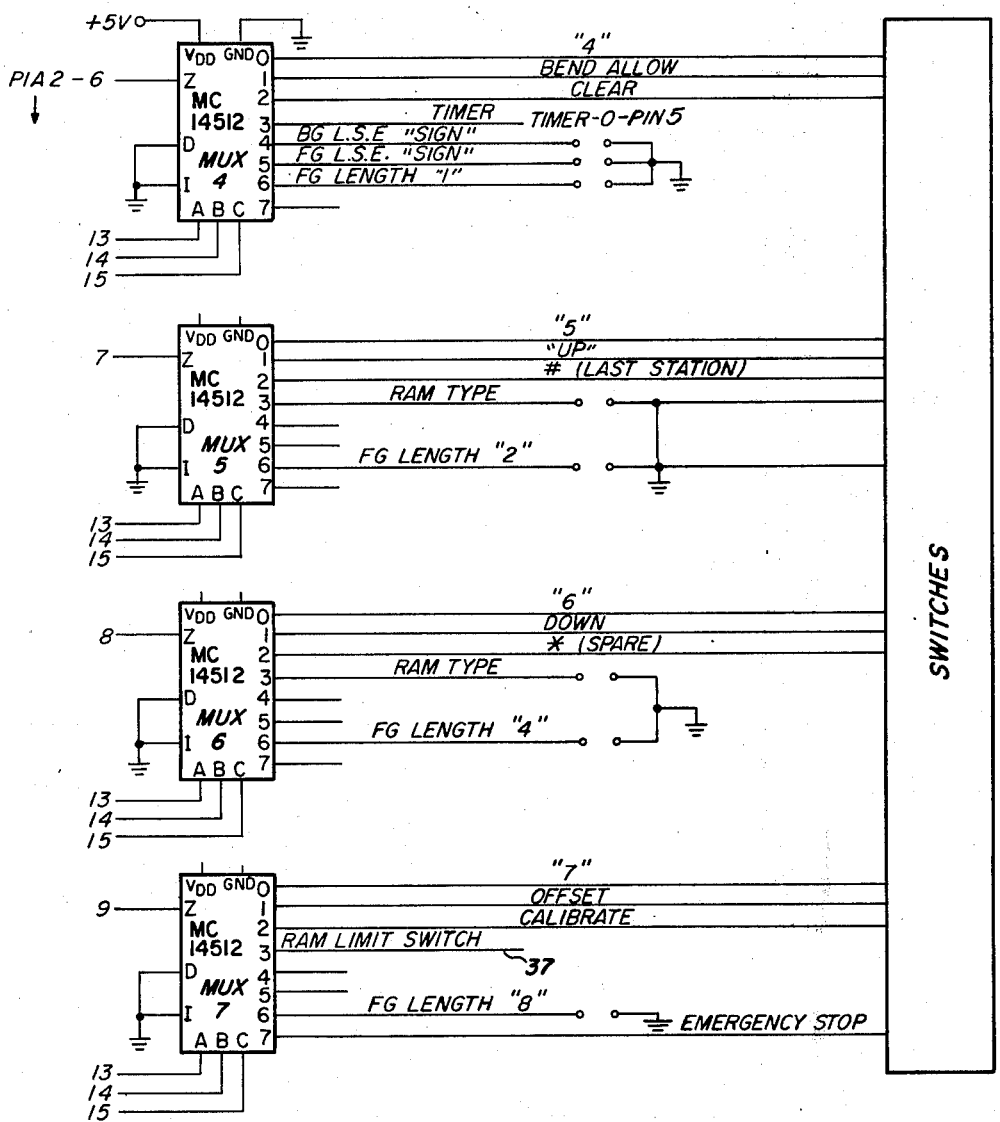

In FIGS. 7D and 7E, some connections of wires from the multiplexers to the PIA are omitted, to avoid undue crowding. Instead, numerical reference is made. For example, at pin 6 of PIA #2, reference is made to "4-Z" meaning MUX 4, terminal Z. Similarly, at terminal Z of MUX 4, reference is made to "PIA2-6" referring to PIA #2, pin 6.

The lines to the right of the multiplexers are labelled with their function. Most go to switches. Typically, closing the switch zero grounds the line. As an example of the labelling, the "9" line from MUX 1 terminal 1 goes to push button switch "9" in array 48 of FIG. 3. The "DS" line goes to the depth stop "DS" push button in array 49 of FIG. 3. The "Check" line goes to the "CHECK" switch portion of the mode switch 46 of FIG. 3.

The label B.G.L.S.E. "2" stands for back gauge lead screw error of 0.002 inches in eight inches of length. Thus, if the gauge drive screw 19S (FIG. 1) for the back gauge which a particular control is to be used with has a nominal length of 24 inches, but is 0.006 inches longer, then a strap is tied between this line and ground. If it is 0.006 inches shorter than 24 inches, then a strap is tied between the B.G.L.S. ERROR "SIGN" line from terminal 4 of MUX 4 to ground. Provisions are made for different errors, such as "1" (MUX $\phi$), "4" (MUX 2), "8" (MUX 3). Like provisions are made to compensate for lead screw errors for front gauges.

Strapping provisions are also made to tailor the control to the particular lead screw length for the back gauge and for the front gauge. For example, where the back gauge has a drive screw length of 12 inches, the "Back Gauge Length '1'" line is strapped. For a screw length of 24 inches, the "Back Gauge Length '2'" line from pin 7 of MUX 1 is strapped. Like provisions are made for front gauge length. As is true for the PIA, some lines for the MUX's are not used, but are available for other functions which could be programmed into the controller. The "ram type" lines from MUX 5 and 6 may be strapped or not, depending on whether the ram is controlled by depth stops or the digital ram control option is used.

Figure 7F:
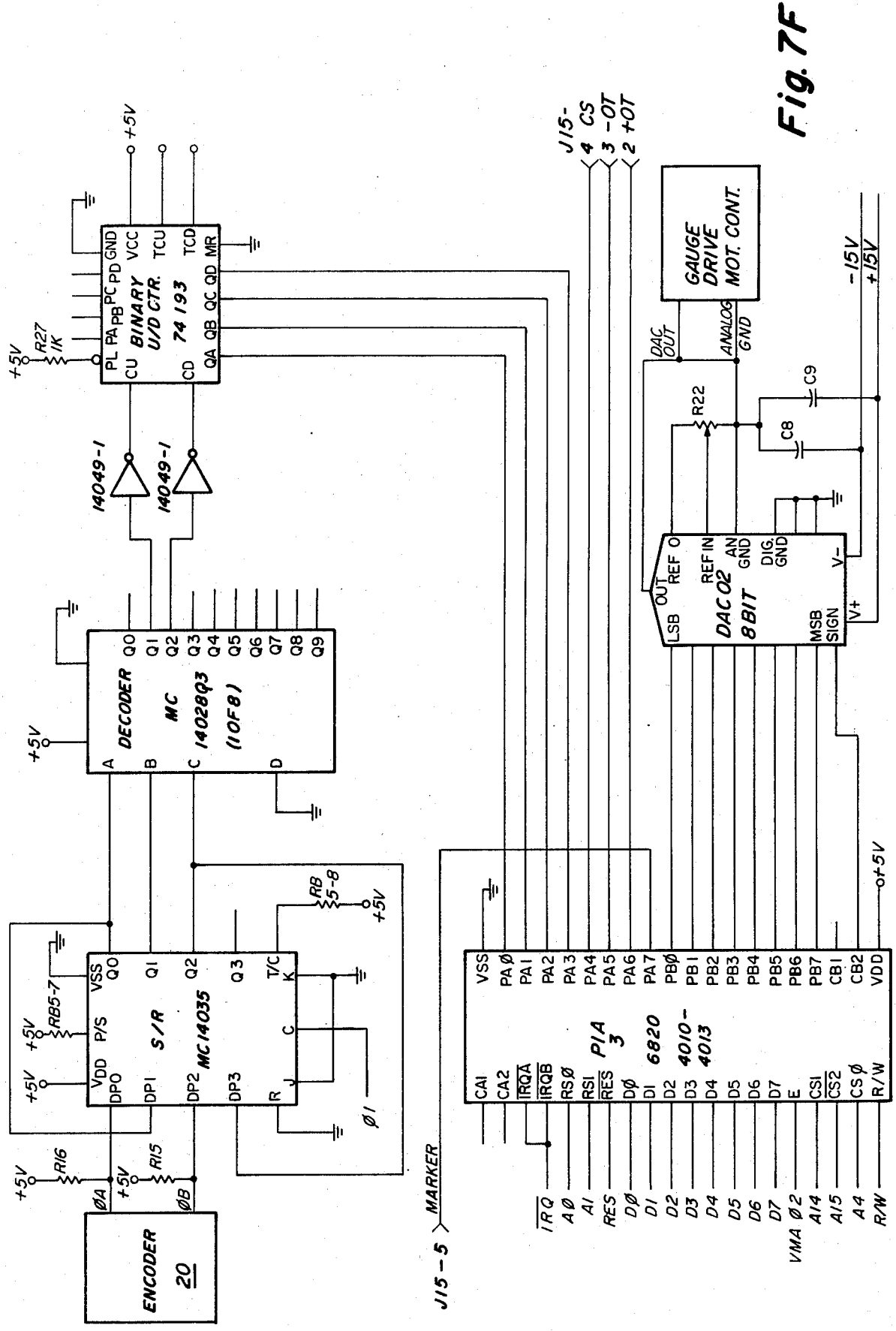
FIG. 7F is a logic diagram of the rear-gauge position and direction sensing and motor control, identifying the connections of PIA #3 to the MPU.

In FIG. 7F, PIA #3 is coupled through the digital to analog converter DAC02 to the rear gauge drive motor controller of conventional manufacture. The voltage level is determined by the computer for speed control. The rotary encoder 20 provides outputs to the shift register MC14035 which is coupled to the 1 of 8 decoder to determine direction of gauge movement, the amount of which is stored in the U/D counter which serves as a buffer to keep track of gauge position while the MPU is processing other data. Four inputs to the PIA #3 provide gauge limit and reference position information. These include inputs from the plus and minus overtravel limit switches +OT and −OT at opposite extremes of gauge travel, and the center switch CS at the center of gauge travel. Coincidence of a center switch input and a shaft angle marker pulse through jack J15-5 is used to establish a precise point from which all moves are referenced. A similar arrangement can be used for a front gauge or gauges.

Figure 7G:
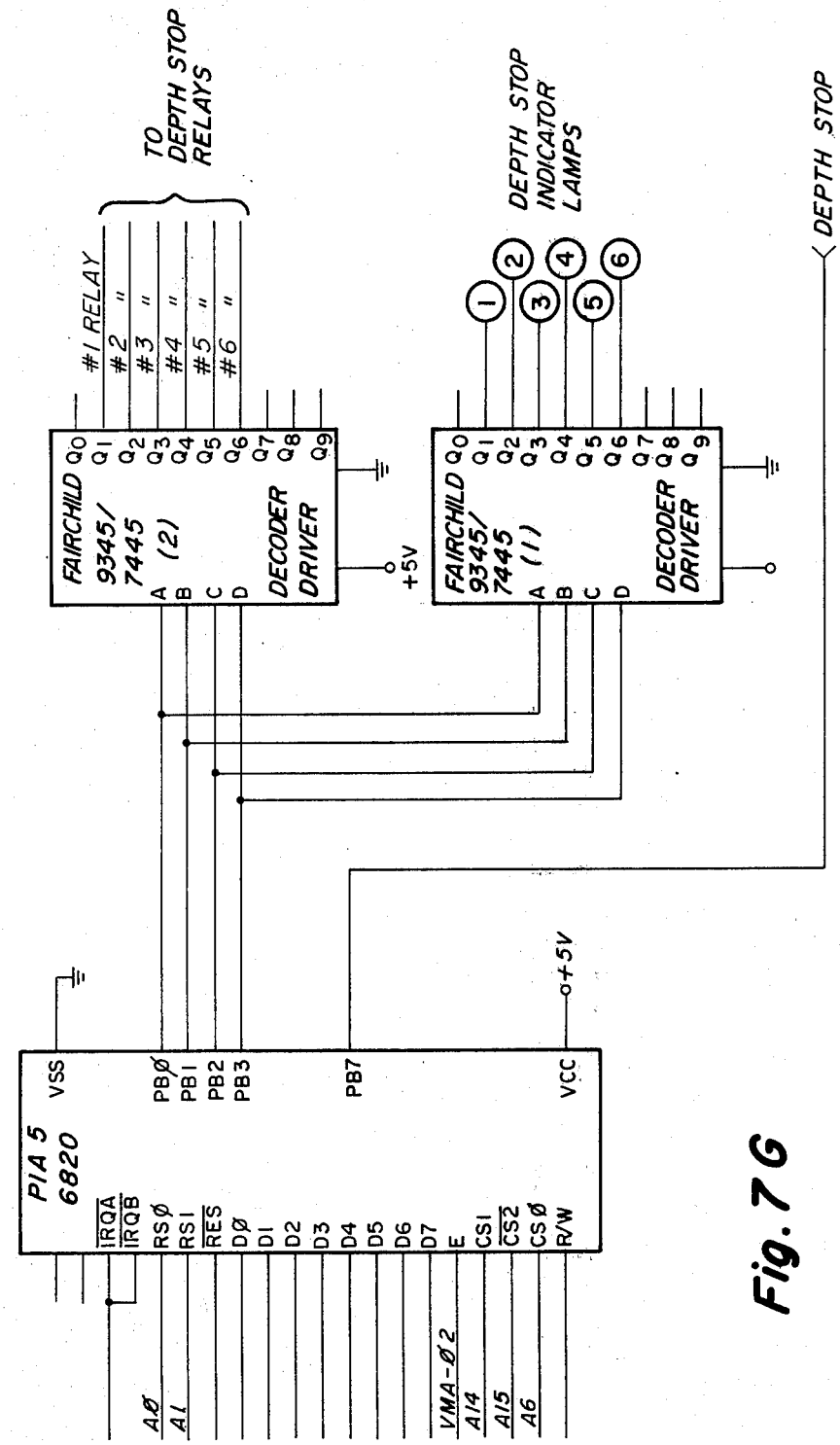
FIG. 7G is a logic diagram of the depth stop limit switch selection relay and indicator lamp drive, identifying the connections of PIA #5 to the MPU.

In FIG. 7G, like on previous figures, the labels on the lines to the left of PIA #5 identify the terminals of the MPU to which they are attached. The outputs to one of the two decoder drivers select which one of the depth stop switches 28 will control any given ram downstroke. The outputs to the other of the decoder drivers illuminate one of the six indicator lamps in the function display 44, depending on which of the depths stops is limiting the ram downstroke.

The program of Appendix B is related to the narration in Appendix A, by line numbers. Such programs can be used with a General Electric time sharing terminal and a Motorola M6800 cross assembler to produce the machine code. Procedures for use of this in simulation and verification and editing and programming the ROM are well known, and some are described in the aforementioned Motorola Micro Computer System Reference Handbook.

Appendix A-Page 1

```
10       THE FOLLOWING IS A VERY BRIEF NARRATION.   THE
11   LINE NUMBERS MATCH THOSE OF THE PROGRAM.
12
1095 A 10-DIGIT ACCUMULATOR FOR UNITS CONVERSION
1100 A 16-BIT POSITIVE INTEGER (IN MILS)
1105 CONTROL BYTE OF CURRENT STATION (MILOSTOP)
1110 UNITS BYTE & 5-DIGIT BCD (DIMENSION OR B.A.)
1115 LOGICAL (ALL LOGICALS, 0=FALSE) = GAUGE IS CALIBRATED
1120 3-DIGIT LED DISPLAY REGISTER
1125 CURRENT LED DIGIT POINTER
1130 WHAT IS BEING ENTERED (0=STA, 1=DIM, 2=B.A., 6=CYC, 7=D.S.)
1135 LOGICAL = RECOVERING FROM EMERGENCY STOP
1140 5-DIGIT KEYBOARD REGISTER
1145 LOGICAL = GAUGE SET LAMP MAY BE TURNED ON
1150 LOGICAL = A KEY WAS DOWN ON THE PREVIOUS SCAN
1155 PANEL LAMP REGISTER CORRESPONDING TO PIA1AD
1160 LOGICAL = PANEL SWITCH IS SET TO MILLIMETERS
1165 16-BIT GAUGE MIDPOINT IN MILS
1170 CURRENT MODE (0=OPERATE, 1=CHECK, 2=ENTER, 3=IDLE)
1175 LOGICAL = THE DIM. OR B.A. IS DISPLY HAS BEEN MODIFIED
1180 16-BIT CURRENT GAUGE POSITION IN MILS
1185 POINTER TO FIRST PROGRAM BYTE OF CURRENT STATION
1190 PREVIOUS GAUGE COUNTER VALUE
1195 DEBOUNCING COUNTER FOR RAM LIMIT SWITCH (MUST CLOSE FOR 40 CYCLES)
1200 LOGICAL = IN OPERATE AND RUNNING (STARTED)
1205 WHAT IS IN DISPLY (0=DIM., 1=B.A.)
1210 16-BIT GAUGE TARGET IN MILS
1215 LOGICAL = IN A RETRACT TIMING OPERATION
1220 TEMPORARY FOR A REG.
1225 TEMPORARY FOR B REG.
1230 LOGICAL = MORE THAN 1 DIGIT OF A NEW STA. # HAS BEEN KEYED
1235 TIMING COUNTER FOR B.A. LAMP WINK (&GOOD STATION SEARCH)
1240 16-BIT ZERO
1245 DISPLY BYTE CONTAINING CYCLES COUNT
1250 LOW 8 BITS FOR X REG. VALUE OF FORM 00XX
1255 16-BIT X REG. VALUE OF FORM 00XX
1265 BEND ALLOWANCE
1270 PROGRAM DATA AREA (THROUGH 7F)
1280 BEGIN: SET INITIAL STACK POINTER
1285-1300 CLEAR MEMORY BELOW 3C
1305-1325 CLEAR ALL PIA'S (CONTROL REG. BEFORE DIR. REG.)
1330-1405 SET ALL PIA'S FOR FUNCTION
1410-1500 SET IDLE & SET UP STATION 1
1535-1540 FOCUS: COPY LAMPS TO BULBS
1545-1560 TEST FOR EMERGENCY STOP
```

Appendix A

```
1570-1600  IF LIMIT SWITCH & NOT ESFLG THEN EMERGENCY STOP
1605-1835  MOVE GAUGE TOWARD TARGET
1840-1865  IF ERROR OVER 4 MILS, TURN OFF GAUGE SET LAMP & LOOP
1870-1965  IF IN CHECK & SHOWING DIM. & B.A. NOT 0, WINK B.A. LAMP
1970-2070  DISPLAY NEXT LED DIGIT
2075-2130  IF UNITS CHANGED, CORRECT DISPLAY UNLESS IS A NEW DIMENSION
2135-2225  IF MASTER CLEAR, CLEAR PROGRAM & SET UP STATION # 1
2230-2365  IF MODE SWITCH CHANGED, RESET (&SAVE VLAUES IF IN ENTER)
2370-2605  SCAN KEYBOARD & JUMP ON MODE (OR PROCESS IF IN OPERATE)
2610-2640  CHECK: TEST & BRANCH ON KEY
2645-2655  SHOW GAUGE OR B.A. AS REQUESTED
2660-2705  PROCESS STATION KEY (INCREMENT STATION #)
2710-2755  PROCESS DIGIT (SHIFT STATION # & MAKE GOOD)
2760-2850  ENTER: TEST & BRANCH ON KEY
2855-2900  STATION KEY; CLEAR TWODIG & SET LAMPS & ENTER
2905-2965  GA OR BA KEY; SAVE OLD VALUE, SHOW NEW VALUE
2970-2995  CYCLES KEY; SET LAMPS & ENTER
3000-3035  DEPTH STOP KEY; SET LAMPS & ENTER
3040-3060  COMPLEMENT RETRACT FLAG BIT & LAMP
3065-3070  COMPLEMENT LAST STATION FLAG BIT & LAMP
3080-3135  CLEAR FIELD, RETRACT & LAST STATION BITS, FAKE A "0" KEY
3140-3185  DIGIT KEY; TEST ENTER & BRANCH
3190-3215  CHANGE DEPTH STOP
3220-3240  CHANGE CYCLES COUNT
3245-3290  CHANGE STATION, SAVE OLD, SHOW NEW
3295-3420  SHIFT DIMENSION & INSERT NEW DIGIT
3425-3500  OPERATE: TEST START/STOP, SET GIPFLG, IF NEW START SET NEW STA.
3505-3530  SET AUTO LAMP TO AGREE WITH RUN
3535-3540  IF STOPPED, LOOP
3545-3565  IF IN RETRACT WAIT, LOOP
3570-3580  IF WAS TIMING, SET UP NEXT STATION
3585-3795  IF NOT CALIBRATED, CALIBRATE
3800-3885  TEST CYCLES FOR 0 & RAM SW. FOR CLOSURE
3890-3960  IF RETRACT OPTION SET TARGET & TRIGGER TIMER
3965-4105  FIND NEXT STATION WITH CYCLES NOT 0 (UP TO 31 TRIES)
4110-4195  CALCULATE TARGET=GAUGE DIM. - BEND ALLOWANCE
4200-4410  COMPENSATE FOR LEADSCREW ERROR
4415-4555  BCDBIN: FORM BINARY FROM DATUM
4560-4630  XTEN: MULTIPLY BINARY BY 10
4635-4695  COPYDN: GET CONTROL DATA FOR NEW STATION
4700-4785  CONLMP: SET LAMPS TO AGREE WITH STATION DATA
4790-4870  FETCH: SET DATUM = GAUGE DIM. OR B.A. AS SPECIFIED BY SHOW
4875-5015  STORE: RECORD DISPLAY VALUE UNLESS UNCHANGED
5020-5095  COPYUP: SAVE CONTROL DATA IN PROGRAM AREA
5100-5205  SHOWIT: FETCH, CONVERT & SHOW (LEDS) DIM. OR B.A. PER SHOW
5210-5265  ETOM: CONVERT DATUM TO MILLIMETERS
5270-5325  MTOE: CONVERT DATUM TO INCHES
5330-5355  CLRSUM: INITIALIZE BCDSUM WITH ZEROES & ROUNDING DIGIT
5360-5485  BCDADD: ADD DATUM TO BCDSUM B-TIMES AT PT. SPEC. BY X
5490-5515  CPYSUM: MOVE HIGH DIGITS OF BCDSUM TO DATUM
5520-5610  STOPIT: EMERGENCY STOP, WAIT FOR RUN, SET ESFLG
5620       RESTART AT BEGIN
```

Appendix B

```
01000                        NAM    HURCO
01005                        OPT    OTAPE=OT,NOPAGE,NOTAB
01010       4004      BULBS  EQU    $4004 PIA1AD
01015       4005      PIA1AC EQU    $4005
01020       4006      LEDS   EQU    $4006 PIA1BD
01025       4007      PIA1BC EQU    $4007
01030       4008      MUXIN  EQU    $4008 PIA2AD
01035       4009      PIA2AC EQU    $4009
01040       400A      MUXOUT EQU    $400A PIA2BD
01045       400B      TIMER  EQU    $400B PIA2BC
01050       4010      GAUGE  EQU    $4010 PIA3AD
```

Appendix B

```
01055       4011        PIA3AC EQU $4011
01060       4012        SPEED  EQU $4012 PIA3BD
01065       4013        DIRECT EQU $4013 PIA3BC
01070       4041        PIA5AC EQU $4041
01075       4042        RAMOUT EQU $4042 PIA5BD
01080       4043        PIA5BC EQU $4043
01085 0000              ORG $0
01090 0000 0006         STACK  RMB 6
01095 0006 0005         BCDSUM RMB 5
01100 000B 0002         BINARY RMB 2
01105 000D 0001         CONTRL RMB 1
01110 000E 0004         DATUM  RMB 4
01115 0012 0001         DIDCAL RMB 1
01120 0013 0004         DISPLY RMB 4
01125 0017 0001         DISPTR RMB 1
01130 0018 0001         ENTER  RMB 1
01135 0019 0001         ESFLG  RMB 1
01140 001A 0005         FIELD  RMB 5
01145 001F 0001         GIPFLG RMB 1
01150 0020 0001         HADKEY RMB 1
01155 0021 0001         LAMPS  RMB 1
01160 0022 0001         METRIC RMB 1
01165 0023 0002         MIDPNT RMB 2
01170 0025 0001         MODE   RMB 1
01175 0026 0001         NEWDIM RMB 1
01180 0027 0002         POSITN RMB 2
01185 0029 0002         PRGADD RMB 2
01190 002B 0001         PRIOR  RMB 1
01195 002C 0001         RAMCNT RMB 1
01200 002D 0001         RUN    RMB 1
01205 002E 0001         SHOW   RMB 1
01210 002F 0002         TARGET RMB 2
01215 0031 0001         TIMING RMB 1
01220 0032 0001         TMPA   RMB 1
01225 0033 0001         TMPB   RMB 1
01230 0034 0001         TWODIG RMB 1
01235 0035 0001         WINK   RMB 1
01240 0036 0003         ZERO   RMB 3
01245       0016        CYCLES EQU DISPLY+3
01250       0038        TMPX   EQU ZERO+2
01255       0037        XFLD   EQU ZERO+1
01260 003C              ORG $3C
01265 003C 0004         BEND   RMB 4
01270 0040 0040         PROGRM RMB 64
01275 F900              ORG $F900
01280 F900 8E 0005      BEGIN LDS #5
01285 F903 CE 003B      LDX #$3B
01290 F906 6F 00        INIZRO CLR 0,X
01295 F908 09           DEX
01300 F909 26 FB        BNE INIZRO
01305 F90B CE 4043      LDX #$4043
01310 F90E 6F 00        PIAZRO CLR 0,X
01315 F910 09           DEX
01320 F911 8C 4003      CPX #$4003
01325 F914 26 F8        BNE PIAZRO
01330 F916 86 FF        LDA A #$FF
01335 F918 B7 4004      STA A BULBS
01340 F91B B7 4006      STA A LEDS
01345 F91E B7 400A      STA A MUXOUT
01350 F921 B7 4012      STA A SPEED
01355 F924 B7 4042      STA A RAMOUT
01360 F927 86 04        LDA A #4
01365 F929 B7 4005      STA A PIA1AC
01370 F92C B7 4007      STA A PIA1BC
01375 F92F B7 4009      STA A PIA2AC
01380 F932 B7 4011      STA A PIA3AC
01385 F935 B7 4041      STA A PIA5AC
01390 F938 B7 4043      STA A PIA5BC
```

Appendix B

```
01395 F93B 86 3C      LDA A #$3C
01400 F93D B7 400B    STA A TIMER
01405 F940 B7 4013    STA A DIRECT
01410 F943 86 18      LDA A #24
01415 F945 B7 400A    STA A MUXOUT
01420 F948 B6 4008    LDA A MUXIN
01425 F94B 43         COM A
01430 F94C 84 04      AND A #4
01435 F94E 97 22      STA A METRIC
01440 F950 C6 30      LDA B #48
01445 F952 F7 400A    STA B MUXOUT
01450 F955 F6 4008    LDA B MUXIN
01455 F958 53         COM B
01460 F959 C4 0F      AND B #$0F
01465 F95B 86 B8   MPLOOP LDA A #$B8
01470 F95D 9B 24      ADD A MIDPNT+1
01475 F95F 97 24      STA A MIDPNT+1
01480 F961 86 0B      LDA A #$0B
01485 F963 99 23      ADC A MIDPNT
01490 F965 97 23      STA A MIDPNT
01495 F967 5A         DEC B
01500 F968 26 F1      BNE MPLOOP
01505 F96A 86 03      LDA A #3
01510 F96C 97 25      STA A MODE
01515 F96E DE 23      LDX MIDPNT
01520 F970 DF 2F      STX TARGET
01525 F972 DF 27      STX POSITN
01530 F974 7E FB4D    JMP CHKZRO
01535 F977 96 21   FOCUS LDA A LAMPS
01540 F979 B7 4004    STA A BULBS
01545 F97C 86 38      LDA A #56
01550 F97E B7 400A    STA A MUXOUT
01555 F981 B6 4008    LDA A MUXIN
01560 F984 2B 03      BMI FOCB
01565 F986 7E FFA8 FOCA JMP STOPIT
01570 F989 B6 4010 FOCB LDA A GAUGE
01575 F98C 16         TAB
01580 F98D 43         COM A
01585 F98E 84 60      AND A #$60
01590 F990 27 05      BEQ FOCC
01595 F992 7D 0019    TST ESFLG
01600 F995 27 EF      BEQ FOCA
01605 F997 F1 4010 FOCC CMP B GAUGE
01610 F99A 26 ED      BNE FOCB
01615 F99C C4 0F      AND B #$0F
01620 F99E 17         TBA
01625 F99F CB 10      ADD B #16
01630 F9A1 D0 2B      SUB B PRIOR
01635 F9A3 97 2B      STA A PRIOR
01640 F9A5 C4 0F      AND B #$0F
01645 F9A7 96 28      LDA A POSITN+1
01650 F9A9 C1 08      CMP B #8
01655 F9AB 23 07      BLS MVDOUT
01660 F9AD 80 10   MVDIN SUB A #16
01665 F9AF 24 03      BCC MVDOUT
01670 F9B1 7A 0027    DEC POSITN
01675 F9B4 1B      MVDOUT ABA
01680 F9B5 97 28      STA A POSITN+1
01685 F9B7 24 03      BCC MOVTST
01690 F9B9 7C 0027    INC POSITN
01695 F9BC 96 2F   MOVTST LDA A TARGET
01700 F9BE 90 27      SUB A POSITN
01705 F9C0 27 15      BEQ NEAR
01710 F9C2 C6 FF      LDA B #$FF
01715 F9C4 25 08      BCS BIGIN
01720 F9C6 84 FC   BIGOUT AND A #$FC
01725 F9C8 26 24      BNE MOVOUT
```

Appendix B

```
01730 F9CA C6 3F     OUT3F  LDA B #$3F
01735 F9CC 20 20            BRA MOVOUT
01740 F9CE 40        BIGIN  NEG A
01745 F9CF 84 FC            AND A #$FC
01750 F9D1 26 17            BNE MOVIN
01755 F9D3 C6 3F     IN3F   LDA B #$3F
01760 F9D5 20 13            BRA MOVIN
01765 F9D7 D6 30     NEAR   LDA B TARGET+1
01770 F9D9 D0 28            SUB B POSITN+1
01775 F9DB 25 06            BCS NERIN
01780 F9DD C1 3F     NEROUT CMP B #$3F
01785 F9DF 23 0D            BLS MOVOUT
01790 F9E1 20 E7            BRA OUT3F
01795 F9E3 50        NERIN  NEG B
01800 F9E4 C1 3F            CMP B #$3F
01805 F9E6 23 02            BLS MOVIN
01810 F9E8 20 E9            BRA IN3F
01815 F9EA 86 34     MOVIN  LDA A #$34
01820 F9EC 20 02            BRA SETDIR
01825 F9EE 86 3C     MOVOUT LDA A #$3C
01830 F9F0 B7 4013   SETDIR STA A DIRECT
01835 F9F3 F7 4012          STA B SPEED
01840 F9F6 96 21            LDA A LAMPS
01845 F9F8 84 DF            AND A #$DF
01850 F9FA C1 04            CMP B #4
01855 F9FC 25 05            BCS GLOW
01860 F9FE 97 21            STA A LAMPS
01865 FA00 7E F977          JMP FOCUS
01870 FA03 D6 25     GLOW   LDA B MODE
01875 FA05 26 0D            BNE BLINK
01880 FA07 D6 31            LDA B TIMING
01885 FA09 26 1F            BNE SHINE
01890 FA0B 7D 001F          TST GIPFLG
01895 FA0E 27 1A            BEQ SHINE
01900 FA10 8A 20            ORA A #$20
01905 FA12 20 16            BRA SHINE
01910 FA14 5A        BLINK  DEC B
01915 FA15 DA 2E            ORA B SHOW
01920 FA17 DA 17            ORA B DISPTR
01925 FA19 26 0F            BNE SHINE
01930 FA1B DA 3D            ORA B BEND+1
01935 FA1D DA 3E            ORA B BEND+2
01940 FA1F DA 3F            ORA B BEND+3
01945 FA21 27 07            BEQ SHINE
01950 FA23 7C 0035          INC WINK
01955 FA26 26 02            BNE SHINE
01960 FA28 88 01            EOR A #1
01965 FA2A 97 21     SHINE  STA A LAMPS
01970 FA2C 96 17     NXTLED LDA A DISPTR
01975 FA2E 4C               INC A
01980 FA2F 84 07            AND A #7
01985 FA31 97 17            STA A DISPTR
01990 FA33 44               LSR A
01995 FA34 97 38            STA A TMPX
02000 FA36 DE 37            LDX XFLD
02005 FA38 E6 13            LDA B DISPLY,X
02010 FA3A 25 04            BCS ODD
02015 FA3C 54               LSR B
02020 FA3D 54               LSR B
02025 FA3E 54               LSR B
02030 FA3F 54               LSR B
02035 FA40 C4 0F     ODD    AND B #$0F
02040 FA42 96 17            LDA A DISPTR
02045 FA44 48               ASL A
02050 FA45 48               ASL A
02055 FA46 48               ASL A
02060 FA47 48               ASL A
```

Appendix B

```
02065 FA48 1B            ABA
02070 FA49 B7 4006       STA A LEDS
02075 FA4C 86 18    UNITS LDA A #24
02080 FA4E B7 400A       STA A MUXOUT
02085 FA51 B6 4008       LDA A MUXIN
02090 FA54 43            COM A
02095 FA55 84 04         AND A #$04
02100 FA57 91 22         CMP A METRIC
02105 FA59 27 0D         BEQ MASCLR
02110 FA5B 97 22         STA A METRIC
02115 FA5D 7D 0026       TST NEWDIM
02120 FA60 26 03         BNE UNIXIT
02125 FA62 BD FF0C       JSR SHOWIT
02130 FA65 7E F977  UNIXIT JMP FOCUS
02135 FA68 96 25    MASCLR LDA A MODE
02140 FA6A 81 02         CMP A #2
02145 FA6C 26 23         BNE MODCHK
02150 FA6E 86 38         LDA A #56
02155 FA70 B7 400A       STA A MUXOUT
02160 FA73 B6 4008       LDA A MUXIN
02165 FA76 84 08         AND A #8
02170 FA78 26 17         BNE MODCHK
02175 FA7A CE 0044       LDX #$44
02180 FA7D A7 3B    PURGE STA A $3B,X
02185 FA7F 09            DEX
02190 FA80 26 FB         BNE PURGE
02195 FA82 97 2E         STA A SHOW
02200 FA84 4C            INC A
02205 FA85 97 13         STA A DISPLY
02210 FA87 BD FE5D       JSR COPYDN
02215 FA8A BD FF0C       JSR SHOWIT
02220 FA8D 5F            CLR B
02225 FA8E 7E FB8D       JMP ENTSTA
02230 FA91 86 18    MODCHK LDA A #24
02235 FA93 B7 400A       STA A MUXOUT
02240 FA96 B6 4008       LDA A MUXIN
02245 FA99 84 03         AND A #3
02250 FA9B 91 25         CMP A MODE
02255 FA9D 27 30         BEQ LOOKEY
02260 FA9F D6 25         LDA B MODE
02265 FAA1 97 25         STA A MODE
02270 FAA3 C1 02         CMP B #2
02275 FAA5 26 06         BNE WASNTE
02280 FAA7 BD FEB6       JSR STORE
02285 FAAA BD FEED       JSR COPYUP
02290 FAAD 4F      WASNTE CLR A
02295 FAAE 97 21         STA A LAMPS
02300 FAB0 B7 4042       STA A RAMOUT
02305 FAB3 97 2D         STA A RUN
02310 FAB5 97 12         STA A DIDCAL
02315 FAB7 97 1F         STA A GIPFLG
02320 FAB9 97 2E         STA A SHOW
02325 FABB 97 31         STA A TIMING
02330 FABD 97 34         STA A TWODIG
02335 FABF BD FE5D       JSR COPYDN
02340 FAC2 BD FF0C       JSR SHOWIT
02345 FAC5 96 25         LDA A MODE
02350 FAC7 81 02         CMP A #2
02355 FAC9 26 04         BNE LOOKEY
02360 FACB 5F            CLR B
02365 FACC 7E FB8D       JMP ENTSTA
02370 FACF C6 10    LOOKEY LDA B #16
02375 FAD1 F7 400A  NXTROW STA B MUXOUT
02380 FAD4 B6 4008       LDA A MUXIN
02385 FAD7 43            COM A
02390 FAD8 26 10         BNE SCAN
02395 FADA C0 08         SUB B #8
```

Appendix B

```
02400 FADC 2A F3          BPL  NXTROW
02405 FADE 97 20    NOKEY STA A HADKEY
02410 FAE0 96 25          LDA A MODE
02415 FAE2 26 03          BNE  GOFO
02420 FAE4 7E FC71        JMP  OPRATE
02425 FAE7 7E F977  GOFO  JMP  FOCUS
02430 FAEA 5C       SCAN  INC  B
02435 FAEB 46             ROR  A
02440 FAEC 24 FC          BCC  SCAN
02445 FAEE 5A      GOTKEY DEC  B
02450 FAEF 96 20          LDA A HADKEY
02455 FAF1 27 02          BEQ  NEWONE
02460 FAF3 20 F2          BRA  GOFO
02465 FAF5 73 0020 NEWONE COM  HADKEY
02470 FAF8 96 25          LDA A MODE
02475 FAFA 81 02          CMP A #2
02480 FAFC 27 68          BEQ  ENTMOD
02485 FAFE 2A E7          BPL  GOFO
02490 FB00 4D             TST  A
02495 FB01 26 2D          BNE  CHECK
02500 FB03 7D 002D        TST  RUN
02505 FB06 26 DF          BNE  GOFO
02510 FB08 C1 0A          CMP B #10
02515 FB0A 2B 07          BMI  PBODIG
02520 FB0C 26 12          BNE  PBOTST
02525 FB0E 7F 0034        CLR  TWODIG
02530 FB11 20 D4          BRA  GOFO
02535 FB13 96 34   PBODIG LDA A TWODIG
02540 FB15 26 05          BNE  PBOTWO
02545 FB17 73 0034        COM  TWODIG
02550 FB1A 20 3B          BRA  CHKDIG
02555 FB1C 96 13   PBOTWO LDA A DISPLY
02560 FB1E 20 37          BRA  CHKDIG
02565 FB20 C1 10   PBOTST CMP B #16
02570 FB22 26 C3          BNE  GOFO
02575 FB24 96 16          LDA A CYCLES
02580 FB26 16             TAB
02585 FB27 C4 0F          AND B #$0F
02590 FB29 27 BC          BEQ  GOFO
02595 FB2B 4A             DEC  A
02600 FB2C 97 16          STA A CYCLES
02605 FB2E 20 B7          BRA  GOFO
02610 FB30 96 13    CHECK LDA A DISPLY
02615 FB32 C1 0A          CMP B #10
02620 FB34 2B 21          BMI  CHKDIG
02625 FB36 27 0E          BEQ  CHKSTA
02630 FB38 C1 0D          CMP B #13
02635 FB3A 2A 07          BPL  CHKXIT
02640 FB3C C0 0B          SUB B #11
02645 FB3E D7 2E   CHKGET STA B SHOW
02650 FB40 BD FF0C        JSR  SHOWIT
02655 FB43 7E F977  CHKXIT JMP  FOCUS
02660 FB46 4C    CHKSTA   INC  A
02665 FB47 0C             CLC
02670 FB48 19             DAA
02675 FB49 81 16          CMP A #$16
02680 FB4B 23 02          BLS  CHKSOK
02685 FB4D 86 01   CHKZRO LDA A #1
02690 FB4F 97 13   CHKSOK STA A DISPLY
02695 FB51 BD FE5D        JSR  COPYDN
02700 FB54 5F             CLR  B
02705 FB55 20 E7          BRA  CHKGET
02710 FB57 48     CHKDIG  ASL  A
02715 FB58 48             ASL  A
02720 FB59 48             ASL  A
02725 FB5A 48             ASL  A
02730 FB5B 1B             ABA
```

Appendix B

```
02735 FB5C 27 EF    CHKNEW BEQ CHKZRO
02740 FB5E 81 16           CMP A #$16
02745 FB60 23 ED           BLS CHKSOK
02750 FB62 84 0F           AND A #$0F
02755 FB64 20 F6           BRA CHKNEW
02760 FB66 C1 0A    ENTMOD CMP B #10
02765 FB68 2A 03           BPL NOTAD
02770 FB6A 7E FC07          JMP ENTDIG
02775 FB6D C0 0A    NOTAD SUB B #10
02780 FB6F 27 1C           BEQ ENTSTA
02785 FB71 C1 02           CMP B #2
02790 FB73 23 2E           BLS ENTGAB
02795 FB75 C1 05           CMP B #5
02800 FB77 23 72           BLS ENTXIT
02805 FB79 C1 07           CMP B #7
02810 FB7B 2B 41           BMI ENTCYC
02815 FB7D 27 4B           BEQ ENTDS
02820 FB7F C1 09           CMP B #9
02825 FB81 2B 59           BMI ENTRT
02830 FB83 27 66           BEQ ENTXIT
02835 FB85 C1 0B           CMP B #11
02840 FB87 2B 65           BMI ENTCLR
02845 FB89 27 5C           BEQ ENTLST
02850 FB8B 20 5E           BRA ENTXIT
02855 FB8D D7 18    ENTSTA STA B ENTER
02860 FB8F D7 34           STA B TWODIG
02865 FB91 96 21           LDA A LAMPS
02870 FB93 84 EF           AND A #$EF
02875 FB95 8A 04           ORA A #$04
02880 FB97 97 21           STA A LAMPS
02885 FB99 B6 4042  DSLOFF LDA A RAMOUT
02890 FB9C 84 0F           AND A #$0F
02895 FB9E B7 4042         STA A RAMOUT
02900 FBA1 20 48           BRA ENTXIT
02905 FBA3 D7 18    ENTGAB STA B ENTER
02910 FBA5 BD FEB6         JSR STORE
02915 FBA8 D6 18           LDA B ENTER
02920 FBAA 5A             DEC B
02925 FBAB D7 2E           STA B SHOW
02930 FBAD BD FF0C         JSR SHOWIT
02935 FBB0 DE 36           LDX ZERO
02940 FBB2 DF 1B           STX FIELD+1
02945 FBB4 DF 1D           STX FIELD+3
02950 FBB6 96 21           LDA A LAMPS
02955 FBB8 84 EB           AND A #$EB
02960 FBBA 97 21           STA A LAMPS
02965 FBBC 20 DB           BRA DSLOFF
02970 FBBE D7 18    ENTCYC STA B ENTER
02975 FBC0 96 21           LDA A LAMPS
02980 FBC2 84 FB           AND A #$FB
02985 FBC4 8A 10           ORA A #$10
02990 FBC6 97 21           STA A LAMPS
02995 FBC8 20 CF           BRA DSLOFF
03000 FBCA D7 18    ENTDS STA B ENTER
03005 FBCC 96 21           LDA A LAMPS
03010 FBCE 84 EB           AND A #$EB
03015 FBD0 97 21           STA A LAMPS
03020 FBD2 B6 4042  DSLON LDA A RAMOUT
03025 FBD5 8A 80           ORA A #$80
03030 FBD7 B7 4042         STA A RAMOUT
03035 FBDA 20 0F           BRA ENTXIT
03040 FBDC 86 40    ENTRT LDA A #$40
03045 FBDE 98 0D    FIXCON EOR A CONTRL
03050 FBE0 97 0D           STA A CONTRL
03055 FBE2 BD FE74         JSR CONLMP
03060 FBE5 20 04           BRA ENTXIT
03065 FBE7 86 20    ENTLST LDA A #$20
```

Appendix B

```
03070 FBE9 20 F3        BRA FIXCON
03075 FBEB 7E F977 ENTXIT JMP FOCUS
03080 FBEE 96 2E  ENTCLR LDA A SHOW
03085 FBF0 26 F9         BNE ENTXIT
03090 FBF2 97 16         STA A CYCLES
03095 FBF4 DE 36         LDX ZERO
03100 FBF6 DF 1A         STX FIELD
03105 FBF8 DF 1C         STX FIELD+2
03110 FBFA 97 1E         STA A FIELD+4
03115 FBFC 96 0D         LDA A CONTRL
03120 FBFE 84 80         AND A #$80
03125 FC00 97 0D         STA A CONTRL
03130 FC02 BD FE74       JSR CONLMP
03135 FC05 20 42         BRA ENTDGB
03140 FC07 DE 1B  ENTDIG LDX FIELD+1
03145 FC09 DF 1A         STX FIELD
03150 FC0B DE 1D         LDX FIELD+3
03155 FC0D DF 1C         STX FIELD+2
03160 FC0F D7 1E         STA B FIELD+4
03165 FC11 D6 18         LDA B ENTER
03170 FC13 27 1D         BEQ ENTDST
03175 FC15 C1 06         CMP B #6
03180 FC17 2B 30         BMI ENTDGB
03185 FC19 27 0D         BEQ ENTDCY
03190 FC1B 96 0D  ENTDDS LDA A CONTRL
03195 FC1D 84 F0         AND A #$F0
03200 FC1F 9A 1E         ORA A FIELD+4
03205 FC21 97 0D         STA A CONTRL
03210 FC23 BD FE74       JSR CONLMP
03215 FC26 20 C3         BRA ENTXIT
03220 FC28 96 16  ENTDCY LDA A CYCLES
03225 FC2A 84 F0         AND A #$F0
03230 FC2C 9A 1E         ORA A FIELD+4
03235 FC2E 97 16         STA A CYCLES
03240 FC30 20 B9         BRA ENTXIT
03245 FC32 BD FEB6 ENTDST JSR STORE
03250 FC35 BD FEED       JSR COPYUP
03255 FC38 D6 1E         LDA B FIELD+4
03260 FC3A 96 34         LDA A TWODIG
03265 FC3C 26 06         BNE ENTDS2
03270 FC3E 73 0034       COM TWODIG
03275 FC41 4F            CLR A
03280 FC42 20 02         BRA ENTDS3
03285 FC44 96 13  ENTDS2 LDA A DISPLY
03290 FC46 7E FB57 ENTDS3 JMP CHKDIG
03295 FC49 86 01  ENTDGB LDA A #1
03300 FC4B 97 26         STA A NEWDIM
03305 FC4D 96 1A         LDA A FIELD
03310 FC4F D6 1C         LDA B FIELD+2
03315 FC51 48            ASL A
03320 FC52 48            ASL A
03325 FC53 48            ASL A
03330 FC54 48            ASL A
03335 FC55 58            ASL B
03340 FC56 58            ASL B
03345 FC57 58            ASL B
03350 FC58 58            ASL B
03355 FC59 9A 1B         ORA A FIELD+1
03360 FC5B DA 1D         ORA B FIELD+3
03365 FC5D 97 14         STA A DISPLY+1
03370 FC5F D7 15         STA B DISPLY+2
03375 FC61 96 1E         LDA A FIELD+4
03380 FC63 48            ASL A
03385 FC64 48            ASL A
03390 FC65 48            ASL A
```

Appendix B

```
03395 FC66 48            ASL A
03400 FC67 D6 16         LDA B CYCLES
03405 FC69 C4 0F         AND B #$0F
03410 FC6B 1B            ABA
03415 FC6C 97 16         STA A CYCLES
03420 FC6E 7E F977       JMP FOCUS
03425 FC71 86 38    OPRATE LDA A #56
03430 FC73 B7 400A       STA A MUXOUT
03435 FC76 B6 4008       LDA A MUXIN
03440 FC79 84 06         AND A #6
03445 FC7B 81 06         CMP A #6
03450 FC7D 27 15         BEQ OPRNSS
03455 FC7F D6 2D         LDA B RUN
03460 FC81 84 02         AND A #2
03465 FC83 97 2D         STA A RUN
03470 FC85 27 0D         BEQ OPRNSS
03475 FC87 11            CBA
03480 FC88 27 0A         BEQ OPRNSS
03485 FC8A 97 1F         STA A GIPFLG
03490 FC8C 7D 0012       TST DIDCAL
03495 FC8F 27 03         BEQ OPRNSS
03500 FC91 7E FD95       JMP OPRTGT
03505 FC94 D6 21    OPRNSS LDA B LAMPS
03510 FC96 C4 BF         AND B #$BF
03515 FC98 96 2D         LDA A RUN
03520 FC9A 27 02         BEQ AUTLMP
03525 FC9C CA 40         ORA B #$40
03530 FC9E D7 21    AUTLMP STA B LAMPS
03535 FCA0 4D            TST A
03540 FCA1 27 6F         BEQ OPRXIT
03545 FCA3 86 18         LDA A #24
03550 FCA5 B7 400A       STA A MUXOUT
03555 FCA8 B6 4008       LDA A MUXIN
03560 FCAB 84 10         AND A #$10
03565 FCAD 26 63         BNE OPRXIT
03570 FCAF 96 31         LDA A TIMING
03575 FCB1 27 03         BEQ OPRCCK
03580 FCB3 7E FD58       JMP OPRNXT
03585 FCB6 96 12    OPRCCK LDA A DIDCAL
03590 FCB8 26 5B         BNE OPRNRM
03595 FCBA 96 21         LDA A LAMPS
03600 FCBC 84 DF         AND A #$DF
03605 FCBE B7 4004       STA A BULBS
03610 FCC1 86 3C         LDA A #$3C
03615 FCC3 B7 4013       STA A DIRECT
03620 FCC6 86 38         LDA A #56
03625 FCC8 B7 400A       STA A MUXOUT
03630 FCCB B7 4012       STA A SPEED
03635 FCCE B6 4008  OPRCAL LDA A MUXIN
03640 FCD1 2B 03         BMI CALGO
03645 FCD3 7E FFA8       JMP STOPIT
03650 FCD6 B6 4010  CALGO LDA A GAUGE
03655 FCD9 16            TAB
03660 FCDA 43            COM A
03665 FCDB 84 70         AND A #$70
03670 FCDD 26 07         BNE CALSW
03675 FCDF 86 7F         LDA A #$7F
03680 FCE1 B7 4012  CALSPD STA A SPEED
03685 FCE4 20 E8         BRA OPRCAL
03690 FCE6 84 60    CALSW AND A #$60
03695 FCE8 27 0D         BEQ CALCTR
03700 FCEA C6 34         LDA B #$34
03705 FCEC 84 40         AND A #$40
03710 FCEE 26 02         BNE CALDIR
03715 FCF0 C6 3C         LDA B #$3C
03720 FCF2 F7 4013  CALDIR STA B DIRECT
03725 FCF5 20 D7         BRA OPRCAL
```

Appendix B

```
03730 FCF7 5D        CALCTR TST B
03735 FCF8 2B 04            BMI CALFIN
03740 FCFA 86 1F            LDA A #$1F
03745 FCFC 20 E3            BRA CALSPD
03750 FCFE 7F 4012   CALFIN CLR SPEED
03755 FD01 D7 12            STA B DIDCAL
03760 FD03 7F 0019          CLR ESFLG
03765 FD06 DE 23            LDX MIDPNT
03770 FD08 DF 2F            STX TARGET
03775 FD0A DF 27            STX POSITN
03780 FD0C C4 0F            AND B #$0F
03785 FD0E D7 2B            STA B PRIOR
03790 FD10 20 7A            BRA OPRLOD
03795 FD12 7E F977   OPRXIT JMP FOCUS
03800 FD15 96 16    OPRNRM LDA A CYCLES
03805 FD17 84 0F            AND A #$0F
03810 FD19 27 1F            BEQ OPRDON
03815 FD1B C6 18            LDA B #24
03820 FD1D F7 400A          STA B MUXOUT
03825 FD20 F6 4008          LDA B MUXIN
03830 FD23 2A 05            BPL RAMON
03835 FD25 5F              CLR B
03840 FD26 D7 2C    RAMSAV STA B RAMCNT
03845 FD28 20 E8            BRA OPRXIT
03850 FD2A D6 2C     RAMON LDA B RAMCNT
03855 FD2C 5C               INC B
03860 FD2D C1 28            CMP B #40
03865 FD2F 2B F5            BMI RAMSAV
03870 FD31 26 DF            BNE OPRXIT
03875 FD33 D7 2C            STA B RAMCNT
03880 FD35 7A 0016          DEC CYCLES
03885 FD38 20 DB            BRA OPRNRM
03890 FD3A 96 0D    OPRDON LDA A CONTRL
03895 FD3C 84 40            AND A #$40
03900 FD3E 27 18            BEQ OPRNXT
03905 FD40 97 31            STA A TIMING
03910 FD42 96 24            LDA A MIDPNT+1
03915 FD44 48               ASL A
03920 FD45 97 30            STA A TARGET+1
03925 FD47 96 23            LDA A MIDPNT
03930 FD49 49               ROL A
03935 FD4A 97 2F            STA A TARGET
03940 FD4C 86 34            LDA A #$34
03945 FD4E B7 400B          STA A TIMER
03950 FD51 86 3C            LDA A #$3C
03955 FD53 B7 400B          STA A TIMER
03960 FD56 20 BA            BRA OPRXIT
03965 FD58 7F 0031   OPRNXT CLR TIMING
03970 FD5B 86 20            LDA A #32
03975 FD5D 97 35            STA A WINK
03980 FD5F 7A 0035   SEARCH DEC WINK
03985 FD62 26 03            BNE MORE
03990 FD64 7E FFA8          JMP STOPIT
03995 FD67 96 0D      MORE LDA A CONTRL
04000 FD69 84 20            AND A #$20
04005 FD6B 27 12            BEQ OPRSTP
04010 FD6D 96 13    OPRDEC LDA A DISPLY
04015 FD6F 8B 99            ADD A #$99
04020 FD71 19               DAA
04025 FD72 97 13            STA A DISPLY
04030 FD74 27 09            BEQ OPRSTP
04035 FD76 BD FE5D          JSR COPYDN
04040 FD79 96 0D            LDA A CONTRL
04045 FD7B 84 20            AND A #$20
04050 FD7D 27 EE            BEQ OPRDEC
04055 FD7F 96 13    OPRSTP LDA A DISPLY
```

Appendix B

```
04060 FD81 8B 01          ADD A #1
04065 FD83 19             DAA
04070 FD84 81 17          CMP A #$17
04075 FD86 26 02          BNE OPRSOK
04080 FD88 86 01          LDA A #1
04085 FD8A 97 13    OPRSOK STA A DISPLY
04090 FD8C BD FE5D  OPRLOD JSR COPYDN
04095 FD8F 96 16          LDA A CYCLES
04100 FD91 84 0F          AND A #$0F
04105 FD93 27 CA          BEQ SEARCH
04110 FD95 7F 002E  OPRTGT CLR SHOW
04115 FD98 BD FE96         JSR FETCH
04120 FD9B BD FF4E         JSR MTOE
04125 FD9E BD FE17         JSR BCDBIN
04130 FDA1 DE 0B           LDX BINARY
04135 FDA3 DF 2F           STX TARGET
04140 FDA5 7C 002E         INC SHOW
04145 FDA8 BD FE96         JSR FETCH
04150 FDAB BD FF4E         JSR MTOE
04155 FDAE BD FE17         JSR BCDBIN
04160 FDB1 96 30           LDA A TARGET+1
04165 FDB3 90 0C           SUB A BINARY+1
04170 FDB5 97 30           STA A TARGET+1
04175 FDB7 24 03           BCC TGTNOC
04180 FDB9 7A 002F         DEC TARGET
04185 FDBC 96 2F    TGTNOC LDA A TARGET
04190 FDBE 90 0B           SUB A BINARY
04195 FDC0 97 2F           STA A TARGET
04200 FDC2 86 20           LDA A #32
04205 FDC4 B7 400A         STA A MUXOUT
04210 FDC7 B6 4008         LDA A MUXIN
04215 FDCA 43              COM A
04220 FDCB 48              ASL A
04225 FDCC 48              ASL A
04230 FDCD 48              ASL A
04235 FDCE 97 33           STA A TMPB
04240 FDD0 48              ASL A
04245 FDD1 97 32           STA A TMPA
04250 FDD3 86 01           LDA A #1
04255 FDD5 97 0B           STA A BINARY
04260 FDD7 4F              CLR A
04265 FDD8 D6 2F           LDA B TARGET
04270 FDDA D0 23           SUB B MIDPNT
04275 FDDC 2A 01           BPL PDELT
04280 FDDE 50              NEG B
04285 FDDF 27 0A    PDELT BEQ LSEFIX
04290 FDE1 9B 32           ADD A TMPA
04295 FDE3 24 03           BCC LSENOC
04300 FDE5 7C 000B         INC BINARY
04305 FDE8 5A      LSENOC DEC B
04310 FDE9 20 F4           BRA PDELT
04315 FDEB 96 0B    LSEFIX LDA A BINARY
04320 FDED 44              LSR A
04325 FDEE 97 0B           STA A BINARY
04330 FDF0 D6 30           LDA B TARGET+1
04335 FDF2 96 2F           LDA A TARGET
04340 FDF4 90 23           SUB A MIDPNT
04345 FDF6 98 33           EOR A TMPB
04350 FDF8 2A 0B           BPL LSESUB
04355 FDFA DB 0B    LSEADD ADD B BINARY
04360 FDFC D7 30           STA B TARGET+1
04365 FDFE 24 0E           BCC LSEDON
04370 FE00 7C 002F         INC TARGET
04375 FE03 20 09           BRA LSEDON
04380 FE05 D0 0B    LSESUB SUB B BINARY
04385 FE07 D7 30           STA B TARGET+1
```

Appendix B

```
04390 FE09 24 03        BCC LSEDON
04395 FE0B 7A 002F      DEC TARGET
04400 FE0E 7F 002E LSEDON CLR SHOW
04405 FE11 BD FF0C      JSR SHOWIT
04410 FE14 7E F977      JMP FOCUS
04415 FE17 DE 36  BCDBIN LDX ZERO
04420 FE19 DF 0B        STX BINARY
04425 FE1B 96 0F        LDA A DATUM+1
04430 FE1D 8D 13        BSR DECBIN
04435 FE1F 8D 25        BSR XTEN
04440 FE21 8D 23        BSR XTEN
04445 FE23 96 10        LDA A DATUM+2
04450 FE25 8D 0B        BSR DECBIN
04455 FE27 8D 1D        BSR XTEN
04460 FE29 96 11        LDA A DATUM+3
04465 FE2B 44           LSR A
04470 FE2C 44           LSR A
04475 FE2D 44           LSR A
04480 FE2E 44           LSR A
04485 FE2F 8D 01        BSR DECBIN
04490 FE31 39           RTS
04495 FE32 16     DECBIN TAB
04500 FE33 84 0F        AND A #$0F
04505 FE35 C4 F0        AND B #$F0
04510 FE37 54           LSR B
04515 FE38 1B           ABA
04520 FE39 54           LSR B
04525 FE3A 54           LSR B
04530 FE3B 1B           ABA
04535 FE3C 9B 0C        ADD A BINARY+1
04540 FE3E 97 0C        STA A BINARY+1
04545 FE40 24 03        BCC DECBX
04550 FE42 7C 000B      INC BINARY
04555 FE45 39     DECBX RTS
04560 FE46 96 0B  XTEN LDA A BINARY
04565 FE48 D6 0C        LDA B BINARY+1
04570 FE4A 58           ASL B
04575 FE4B 49           ROL A
04580 FE4C 97 32        STA A TMPA
04585 FE4E D7 33        STA B TMPB
04590 FE50 58           ASL B
04595 FE51 49           ROL A
04600 FE52 58           ASL B
04605 FE53 49           ROL A
04610 FE54 DB 33        ADD B TMPB
04615 FE56 D7 0C        STA B BINARY+1
04620 FE58 99 32        ADC A TMPA
04625 FE5A 97 0B        STA A BINARY
04630 FE5C 39           RTS
04635 FE5D 96 13  COPYDN LDA A DISPLY
04640 FE5F 81 09        CMP A #9
04645 FE61 23 02        BLS CPYDNA
04650 FE63 80 06        SUB A #6
04655 FE65 4A     CPYDNA DEC A
04660 FE66 48           ASL A
04665 FE67 48           ASL A
04670 FE68 97 2A        STA A PRGADD+1
04675 FE6A DE 29        LDX PRGADD
04680 FE6C A6 43        LDA A PROGRM+3,X
04685 FE6E 97 16        STA A CYCLES
04690 FE70 A6 40        LDA A PROGRM,X
04695 FE72 97 0D        STA A CONTRL
04700 FE74 96 0D  CONLMP LDA A CONTRL
04705 FE76 16           TAB
04710 FE77 84 0F        AND A #$0F
04715 FE79 97 32        STA A TMPA
```

Appendix B

```
04720 FE7B B6 4042    LDA A RAMOUT
04725 FE7E 84 80      AND A #$80
04730 FE80 9A 32      ORA A TMPA
04735 FE82 B7 4042    STA A RAMOUT
04740 FE85 96 21      LDA A LAMPS
04745 FE87 84 BD      AND A #$BD
04750 FE89 58         ASL B
04755 FE8A 2A 02      BPL CNLMPA
04760 FE8C 8A 02      ORA A #$02
04765 FE8E 58         CNLMPA ASL B
04770 FE8F 2A 02      BPL CNLMPB
04775 FE91 8A 40      ORA A #$40
04780 FE93 97 21      CNLMPB STA A LAMPS
04785 FE95 39         RTS
04790 FE96 96 2E      FETCH LDA A SHOW
04795 FE98 27 09      BEQ FTCHGA
04800 FE9A DE 3C      LDX BEND
04805 FE9C DF 0E      STX DATUM
04810 FE9E DE 3E      LDX BEND+2
04815 FEA0 DF 10      STX DATUM+2
04820 FEA2 39         RTS
04825 FEA3 DE 29      FTCHGA LDX PRGADD
04830 FEA5 A6 43      LDA A PROGRM+3,X
04835 FEA7 84 F0      AND A #$F0
04840 FEA9 97 11      STA A DATUM+3
04845 FEAB A6 40      LDA A PROGRM,X
04850 FEAD 84 80      AND A #$80
04855 FEAF 97 0E      STA A DATUM
04860 FEB1 EE 41      LDX PROGRM+1,X
04865 FEB3 DF 0F      STX DATUM+1
04870 FEB5 39         RTS
04875 FEB6 96 26      STORE LDA A NEWDIM
04880 FEB8 27 17      BEQ STRXIT
04885 FEBA 96 2E      LDA A SHOW
04890 FEBC 27 14      BEQ STRGA
04895 FEBE 4F         CLR A
04900 FEBF D6 22      LDA B METRIC
04905 FEC1 27 02      BEQ STRBA
04910 FEC3 86 80      LDA A #$80
04915 FEC5 97 3C      STRBA STA A BEND
04920 FEC7 96 16      LDA A CYCLES
04925 FEC9 84 F0      AND A #$F0
04930 FECB 97 3F      STA A BEND+3
04935 FECD DE 14      LDX DISPLY+1
04940 FECF DF 3D      STX BEND+1
04945 FED1 39         STRXIT RTS
04950 FED2 DE 29      STRGA LDX PRGADD
04955 FED4 96 16      LDA A CYCLES
04960 FED6 A7 43      STA A PROGRM+3,X
04965 FED8 A6 40      LDA A PROGRM,X
04970 FEDA 84 7F      AND A #$7F
04975 FEDC D6 22      LDA B METRIC
04980 FEDE 27 02      BEQ STRC
04985 FEE0 8A 80      ORA A #$80
04990 FEE2 A7 40      STRC STA A PROGRM,X
04995 FEE4 96 14      LDA A DISPLY+1
05000 FEE6 A7 41      STA A PROGRM+1,X
05005 FEE8 96 15      LDA A DISPLY+2
05010 FEEA A7 42      STA A PROGRM+2,X
05015 FEEC 39         RTS
05020 FEED DE 29      COPYUP LDX PRGADD
05025 FEEF 96 0D      LDA A CONTRL
05030 FEF1 84 7F      AND A #$7F
05035 FEF3 97 32      STA A TMPA
05040 FEF5 A6 40      LDA A PROGRM,X
05045 FEF7 84 80      AND A #$80
```

Appendix B

```
05050 FEF9 9A 32         ORA  A TMPA
05055 FEFB A7 40         STA  A PROGRM,X
05060 FEFD 96 16         LDA  A CYCLES
05065 FEFF 84 0F         AND  A #$0F
05070 FF01 97 32         STA  A TMPA
05075 FF03 A6 43         LDA  A PROGRM+3,X
05080 FF05 84 F0         AND  A #$F0
05085 FF07 9A 32         ORA  A TMPA
05090 FF09 A7 43         STA  A PROGRM+3,X
05095 FF0B 39            RTS
05100 FF0C 96 21  SHOWIT LDA  A LAMPS
05105 FF0E 84 F6         AND  A #$F6
05110 FF10 D6 2E         LDA  B SHOW
05115 FF12 26 04         BNE  SHOWA
05120 FF14 8A 08         ORA  A #$08
05125 FF16 20 01         BRA  SHOWB
05130 FF18 4C     SHOWA  INC  A
05135 FF19 97 21  SHOWB  STA  A LAMPS
05140 FF1B BD FE96       JSR  FETCH
05145 FF1E 96 22         LDA  A METRIC
05150 FF20 26 04         BNE  SHOWC
05155 FF22 8D 2A         BSR  MTOE
05160 FF24 20 02         BRA  SHOWD
05165 FF26 8D 10  SHOWC  BSR  ETOM
05170 FF28 DE 0F  SHOWD  LDX  DATUM+1
05175 FF2A DF 14         STX  DISPLY+1
05180 FF2C 96 16         LDA  A CYCLES
05185 FF2E 84 0F         AND  A #$0F
05190 FF30 9A 11         ORA  A DATUM+3
05195 FF32 97 16         STA  A CYCLES
05200 FF34 7F 0026       CLR  NEWDIM
05205 FF37 39            RTS
05210 FF38 96 0E  ETOM   LDA  A DATUM
05215 FF3A 2B 11         BMI  ETOMX
05220 FF3C 8D 26         BSR  CLRSUM
05225 FF3E C6 02         LDA  B #2
05230 FF40 8D 2D         BSR  BCDADD
05235 FF42 08            INX
05240 FF43 C6 36         LDA  B #54
05245 FF45 8D 28         BSR  BCDADD
05250 FF47 8D 54         BSR  CPYSUM
05255 FF49 86 80         LDA  A #$80
05260 FF4B 97 0E         STA  A DATUM
05265 FF4D 39     ETOMX  RTS
05270 FF4E 96 0E  MTOE   LDA  A DATUM
05275 FF50 2A 11         BPL  MTOEX
05280 FF52 8D 10         BSR  CLRSUM
05285 FF54 08            INX
05290 FF55 C6 27         LDA  B #39
05295 FF57 8D 16         BSR  BCDADD
05300 FF59 08            INX
05305 FF5A C6 25         LDA  B #37
05310 FF5C 8D 11         BSR  BCDADD
05315 FF5E 8D 3D         BSR  CPYSUM
05320 FF60 7F 000E       CLR  DATUM
05325 FF63 39     MTOEX  RTS
05330 FF64 86 05  CLRSUM LDA  A #$05
05335 FF66 97 08         STA  A BCDSUM+2
05340 FF68 DE 36         LDX  ZERO
05345 FF6A DF 06         STX  BCDSUM
05350 FF6C DF 09         STX  BCDSUM+3
05355 FF6E 39            RTS
05360 FF6F 96 11  BCDADD LDA  A DATUM+3
05365 FF71 AB 08         ADD  A BCDSUM+2,X
05370 FF73 19            DAA
```

Appendix B

```
05375 FF74 A7 08         STA A BCDSUM+2,X
05380 FF76 96 10         LDA A DATUM+2
05385 FF78 A9 07         ADC A BCDSUM+1,X
05390 FF7A 19            DAA
05395 FF7B A7 07         STA A BCDSUM+1,X
05400 FF7D 96 0F         LDA A DATUM+1
05405 FF7F A9 06         ADC A BCDSUM,X
05410 FF81 19            DAA
05415 FF82 A7 06         STA A BCDSUM,X
05420 FF84 8C 0001       CPX #1
05425 FF87 2B 10         BMI BCDOX
05430 FF89 27 07         BEQ BCD1X
05435 FF8B 86 00         LDA A #0
05440 FF8D 99 07         ADC A BCDSUM+1
05445 FF8F 19            DAA
05450 FF90 97 07         STA A BCDSUM+1
05455 FF92 86 00   BCD1X LDA A #0
05460 FF94 99 06         ADC A BCDSUM
05465 FF96 19            DAA
05470 FF97 97 06         STA A BCDSUM
05475 FF99 5A      BCDOX DEC B
05480 FF9A 26 D3         BNE BCDADD
05485 FF9C 39            RTS
05490 FF9D DE 06   CPYSUM LDX BCDSUM
05495 FF9F DF 0F         STX DATUM+1
05500 FFA1 96 08         LDA A BCDSUM+2
05505 FFA3 84 F0         AND A #$F0
05510 FFA5 97 11         STA A DATUM+3
05515 FFA7 39            RTS
05520 FFA8 4F      STOPIT CLR A
05525 FFA9 B7 4012       STA A SPEED
05530 FFAC 86 80         LDA A #$80
05535 FFAE B7 4004       STA A BULBS
05540 FFB1 97 19         STA A ESFLG
05545 FFB3 86 38         LDA A #56
05550 FFB5 B7 400A       STA A MUXOUT
05555 FFB8 B6 4008 STOPA LDA A MUXIN
05560 FFBB 84 04         AND A #$04
05565 FFBD 26 F9         BNE STOPA
05570 FFBF 86 01         LDA A #1
05575 FFC1 97 25         STA A MODE
05580 FFC3 DE 23         LDX MIDPNT
05585 FFC5 DF 2F         STX TARGET
05590 FFC7 DF 27         STX POSITN
05595 FFC9 B6 4010       LDA A GAUGE
05600 FFCC 84 0F         AND A #$0F
05605 FFCE 97 2B         STA A PRIOR
05610 FFD0 7E F977       JMP FOCUS
05615 FFFE              ORG $FFFE
05620 FFFE F900         VECTOR FDB $F900
05625                   MON

PROGRAM STOP AT 0

USED  242.57 UNITS
OLD OT
```

What is claimed is:

1. In positioning apparatus for machines, the improvement comprising:

a machine drive means, and a workpiece material locating gauge;

a controller having read-only memory means therein and random access memory means therein and a microprocessor therein and a numerical keyboard for sequential entry into said random access memory means of a group of gauge and machine drive position data numbers to identify gauge and machine drive position to be achieved, and additional keys for entry of instructions to said random access memory means and microprocessor for processing said data numbers according to said instructions to produce output control signals in a desired sequence;

said controller supplying first control signals for controlling said gauge positioning and second control signals for controlling said machine drive, said controller being programmed to produce control signals to automatically drive said gauge and machine drive to positions in accordance with said position data in sequence according to said instructions.

2. The combination of claim 1 and further comprising:
digital number display means; and
digital number review key for displaying on said display means, the position designating numbers entered on said keyboard.

3. The combination of claim 1 and further comprising: delimiting key means for defining groups of said position representative numbers for advance of the controller through one group at a time repetitively before advancing to another group.

4. The combination of claim 1 and further comprising:
a bend allowance key for manually entering digitally into the controller memory a number to be subtracted from a component position designating number entered by position designating key means of said keyboard.

5. The improvement of claim 1 wherein:
said controller is pendant and has swivel mounting arm means thereon for connection to a machine tool.

6. The improvement of claim 5 wherein the swivel mounting means include:
a pair of arms swivel mounted together at a joint and at least one of said arms having a swivel at the end of the arm remote from said joint.

7. The improvement of claim 1 wherein said controller includes a cabinet having outside dimensions encompassing a volume of less than 1200 cubic inches.

8. The improvement of claim 7 wherein:
said microprocessor can be programmed to process information and produce outputs including dimension data, dimension correction data, and cycle repetition data.

9. The improvement of claim 1 wherein said controller includes a cabinet having outside dimensions enclosing said memory means, microprocessor, keyboard and additional keys, said cabinet enclosing a volume of less than 1100 cubic inches.

10. The improvement of claim 1 and further comprising:
a gauge drive motor coupled to said controller, and
a screw coupled to said gauge and to said motor for driving the gauge to various positions.

* * * * *